(12) United States Patent
Nakagawa et al.

(10) Patent No.: US 10,315,111 B2
(45) Date of Patent: Jun. 11, 2019

(54) INFORMATION PROCESSING DEVICE AND INFORMATION PROCESSING METHOD

(71) Applicant: SONY CORPORATION, Tokyo (JP)

(72) Inventors: Yusuke Nakagawa, Kanagawa (JP); Tomohisa Takaoka, Kanagawa (JP); Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/738,890

(22) PCT Filed: May 17, 2016

(86) PCT No.: PCT/JP2016/064641
§ 371 (c)(1),
(2) Date: Dec. 21, 2017

(87) PCT Pub. No.: WO2017/002473
PCT Pub. Date: Jan. 5, 2017

(65) Prior Publication Data
US 2018/0185753 A1    Jul. 5, 2018

(30) Foreign Application Priority Data

Jun. 30, 2015   (JP) .................................. 2015-131164

(51) Int. Cl.
*A63F 13/40*    (2014.01)
*A63F 13/422*   (2014.01)
(Continued)

(52) U.S. Cl.
CPC ............ *A63F 13/422* (2014.09); *A63F 13/21* (2014.09); *A63F 13/211* (2014.09);
(Continued)

(58) Field of Classification Search
CPC ..................................................... A63F 13/40
See application file for complete search history.

(56) References Cited

U.S. PATENT DOCUMENTS

2009/0079816 A1    3/2009  Qvarfordt et al.
2015/0304252 A1   10/2015  Ogata et al.
2015/0355463 A1   12/2015  Sako et al.

FOREIGN PATENT DOCUMENTS

CN     104584007 A    4/2015
CN     104919518 A    9/2015
(Continued)

OTHER PUBLICATIONS

International Search Report and Written Opinion of PCT Application No. PCT/JP2016/064641, dated Aug. 6, 2016, 09 pages of ISRWO.

*Primary Examiner* — Omkar A Deodhar
(74) *Attorney, Agent, or Firm* — Chip Law Group

(57) ABSTRACT

The present technology relates an information processing device, an information processing method, and a program capable of suppressing the transmission to others of information generated by inappropriate bodily movements or the like. An information processing device according to the present disclosure includes: an acquisition unit that acquires a recognition result indicating at least one of a user movement or state recognized by a recognition unit utilizing a detection result from one or a plurality of sensors; and a control unit that, in a case of determining that the recognition result indicates a specific user movement or state, controls a degree of reflection in which information related to the specific user movement or state is reflected in notification information that transmits the information related to the specific user movement or state to a target different from the user, in accordance with the target.

13 Claims, 23 Drawing Sheets

(51) Int. Cl.
*G06F 13/00* (2006.01)
*A63F 13/21* (2014.01)
*A63F 13/211* (2014.01)
*A63F 13/212* (2014.01)
*A63F 13/213* (2014.01)
*A63F 13/215* (2014.01)
*A63F 13/217* (2014.01)
*A63F 13/428* (2014.01)
*A63F 13/85* (2014.01)
*A63F 13/25* (2014.01)
*A63F 13/5255* (2014.01)
*G06F 3/01* (2006.01)
*G06K 9/00* (2006.01)

(52) U.S. Cl.
CPC .......... *A63F 13/212* (2014.09); *A63F 13/213* (2014.09); *A63F 13/215* (2014.09); *A63F 13/217* (2014.09); *A63F 13/25* (2014.09); *A63F 13/428* (2014.09); *A63F 13/5255* (2014.09); *A63F 13/85* (2014.09); *G06F 3/011* (2013.01); *G06F 13/00* (2013.01); *A63F 2300/8082* (2013.01); *G06F 2203/011* (2013.01); *G06K 9/00335* (2013.01)

(56) References Cited

FOREIGN PATENT DOCUMENTS

| | | |
|---|---|---|
| EP | 2894573 A1 | 7/2015 |
| JP | 2007-049510 A | 2/2007 |
| JP | 2009-077380 A | 4/2009 |
| JP | 2012-043284 A | 3/2012 |
| JP | 2012-054897 A | 3/2012 |
| WO | 2014/038323 A1 | 3/2014 |
| WO | 2014/115393 A1 | 7/2014 |

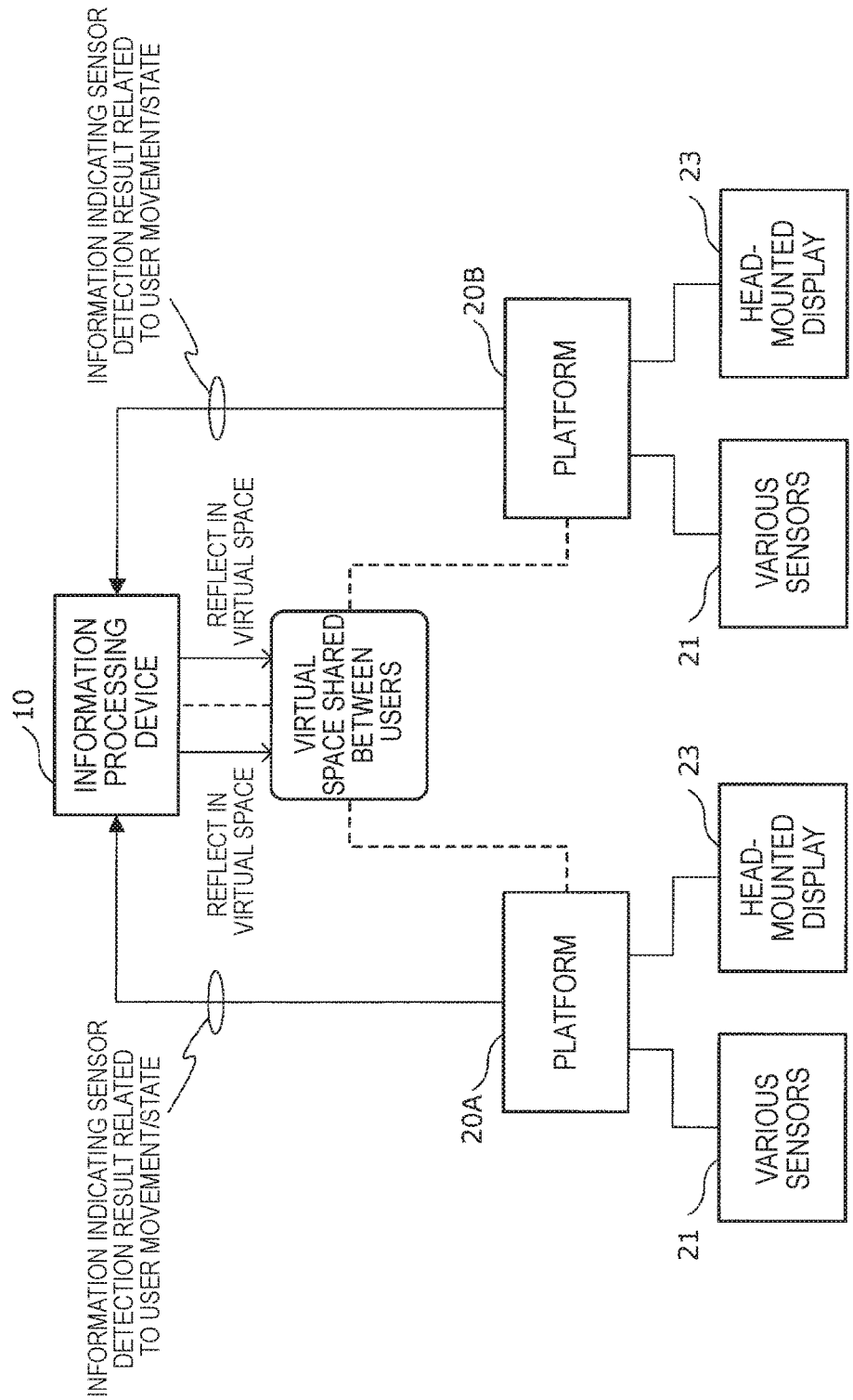

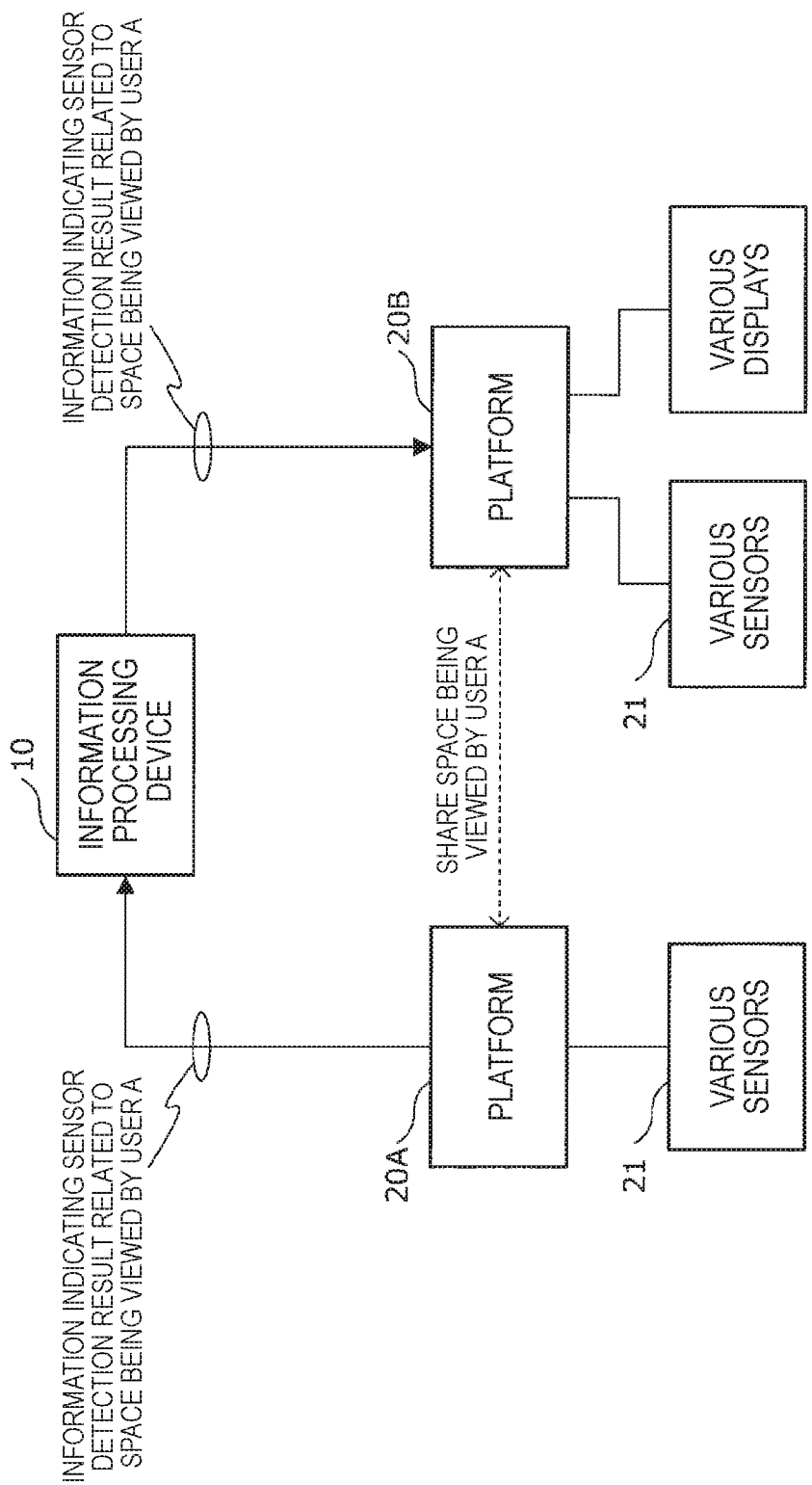

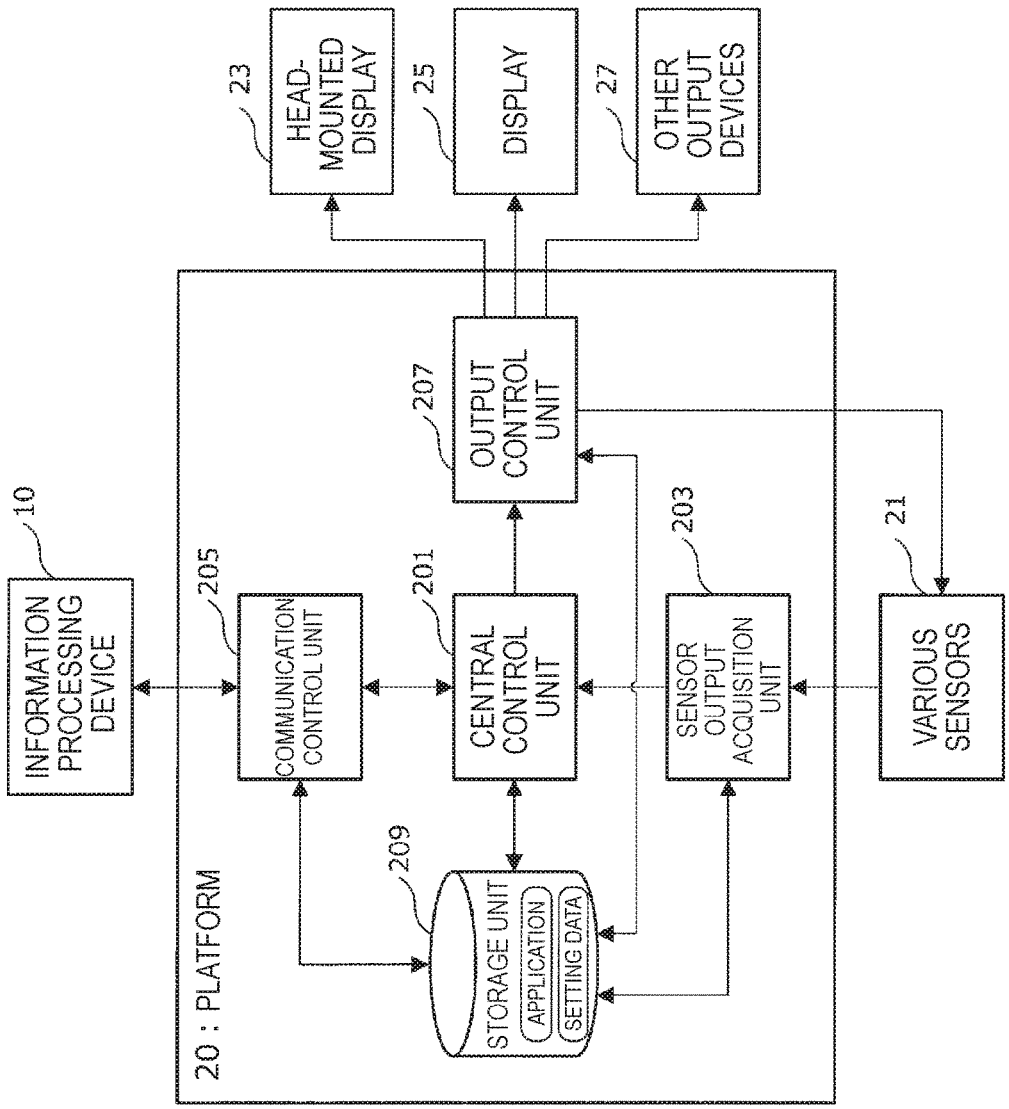

FIG. 5A

| GENRE | ID | UNDESIRABLE INFORMATION TO TRANSMIT UNDESIRABLE INFORMATION TO RECEIVE | REASON |
|---|---|---|---|
| | 1 | PERSONAL HABITS | GENERALLY UNDESIRABLE FOR OTHERS TO KNOW OR SEE. RISK OF INDIVIDUAL BEING IDENTIFIED BY THE INFORMATION. |
| | 2 | MOVEMENTS UNRELATED TO APPLICATION | IF PERFORMED WHILE INFORMATION IS BEING SHARED, SOME PEOPLE FEEL UNCOMFORTABLE. |
| BODILY MOVEMENTS | 3 | UNPLEASANT PHYSIOLOGICAL PHENOMENA | SOME PEOPLE FEEL UNCOMFORTABLE. |
| | 4 | PHYSIOLOGICAL PHENOMENA WHICH ARE NOT PARTICULARLY UNPLEASANT | ALTHOUGH NOT UNPLEASANT, ONE IS BOTHERED IF PERFORMED BY OTHERS. MOVEMENTS SHOULD BE CONCEALED IF POSSIBLE. |
| | 5 | INSULTING MOVEMENTS | MOVEMENTS WHICH GENERALLY MAKE PEOPLE FEEL UNPLEASANT. |
| | 6 | NUISANCE MOVEMENTS | MOVEMENTS WHICH GENERALLY MAKE PEOPLE FEEL UNPLEASANT. |
| | 7 | CRYING FACE | MAY NOT WANT OTHERS TO SEE ONESELF CRYING. |
| FACIAL EXPRESSIONS | 8 | BORED-LOOKING FACE | MAY FEEL UNPLEASANT IF SUCH FACE IS MADE WHILE SHARING INFORMATION. |
| | 9 | ANGRY-LOOKING FACE | MAY FEEL UNPLEASANT IF OTHERS ARE ANGRY AT ONESELF. |

FIG. 5B

| GENRE | ID | UNDESIRABLE INFORMATION TO TRANSMIT UNDESIRABLE INFORMATION TO RECEIVE | REASON |
|---|---|---|---|
| SENSE OF SIGHT | 10 | DIRECTING GAZE AT SPECIFIC TARGET | OBJECT OF INTEREST OR CONCERN MAY BE INFERRED. |
| | 11 | DARTING ONE'S GAZE AROUND | POSSIBILITY OF INDIVIDUAL BEING IDENTIFIED. |
| SENSE OF TOUCH | 12 | VIBRATIONS EXCEEDING CERTAIN STRENGTH CONTINUOUS VIBRATIONS | MAY FEEL UNCOMFORTABLE. |
| SENSE OF HEARING | 13 | MASTICATION SOUNDS | SOUNDS WHICH GENERALLY MAKE PEOPLE FEEL UNPLEASANT. |
| SENSE OF SMELL | 14 | BODY ODOR OR SCENT OF PERFUME | MAY FEEL UNCOMFORTABLE. |
| | 15 | HOME ODORS OR SMELLS OF COOKING | MAY FEEL UNCOMFORTABLE. |
| BIOLOGICAL INFORMATION | 16 | PERSPIRATION | SOME PEOPLE FEEL UNCOMFORTABLE. |
| | 17 | PULSE | UNDESIRABLE FOR OTHERS TO KNOW IN SOME CASES, BECAUSE OF POSSIBILITY OF DISEASE OR AGE BEING IDENTIFIED. |
| PERSONAL INFORMATION | 18 | INFORMATION ABOUT LIVING ENVIRONMENT | POSSIBILITY OF HOME ETC. BEING IDENTIFIED BY SURROUNDING NOISE |
| | 19 | NAME | INDIVIDUAL IS IDENTIFIED. |
| . . . | . . . | . . . | . . . |

FIG. 6

| TECHNIQUE ID | SENSORS MAINLY USED | DETECTION METHOD | ID OF RECOGNIZABLE INFORMATION |
|---|---|---|---|
| A | CAMERA | TRACK USER MOTION, AND DETERMINE WHETHER OR NOT TARGET OBJECT HAS ENTERED INTO TARGET REGION | 1, 2 |
| B | MOTION SENSOR | DETERMINE USER MOTION WITH ACCELERATION SENSOR, GYRO SENSOR. ALTERNATIVELY, LEARN BY MACHINE LEARNING TO PREDICT AND ESTIMATE TARGET MOVEMENT. | 1, 2, 3, 4, 5, 6 |
| C | CAMERA | IMAGE USER MOTION, MATCH CAPTURED IMAGE WITH IMAGE OF INAPPROPRIATE ACTIVITY ETC., AND DETERMINE IN ACCORDANCE WITH SIMILARITY. | 1, 2, 5, 7, 8, 9, 19 |
| D | ILLUMINANCE SENSOR | UTILIZE SURROUNDING ENVIRONMENTAL SENSORS, AND SPECIFY MOVEMENT ABOUT TO BE PERFORMED OR INFORMATION ABOUT TO BE PRODUCED. | 18 |
| E | ODOR SENSOR | ANALYZE PRODUCED ODORS, AND SENSE WHETHER SPECIFIC ODOR IS BEING PRODUCED. | 14, 15 |
| F | MOTION SENSOR/ CAMERA | DETERMINE WHETHER OR NOT FEATURE FROM ACCELERATION SENSOR OR CAMERA IMAGE REPEATS CERTAIN VALUE. | 6 |
| G | MICROPHONE | LEARN OR SET WAVELENGTH OR SPECTRUM OF SPECIFIC UNPLEASANT SOUND, AND DETERMINE BY COMPARING TO INPUT SOUND. | 13, 18, 19 |
| H | VIBRATION SENSOR | DETERMINE WHETHER OR NOT MAXIMUM AMPLITUDE OR AVERAGE AMPLITUDE VALUE OVER CERTAIN TIME OF WAVELENGTH EXCEEDS CERTAIN THRESHOLD VALUE. | 12 |
| I | BIOLOGICAL SENSOR (PERSPIRATION SENSOR) | SPECIFY PERSPIRATION AMOUNT, AND DETERMINE WHETHER OR NOT THRESHOLD VALUE IS EXCEEDED. | 16 |
| J | BIOLOGICAL SENSOR (PULSE WAVE SENSOR) | ANALYZE FEATURES FROM DETECTION RESULT, AND DETERMINE WHETHER OR NOT CERTAIN FEATURE IS INCLUDED. | 17 |
| K | CAMERA | ESTIMATE GAZE POSITION, AND DETERMINE DIRECTION. GAZE POSITION ESTIMATED BY MACHINE LEARNING. | 10, 11 |

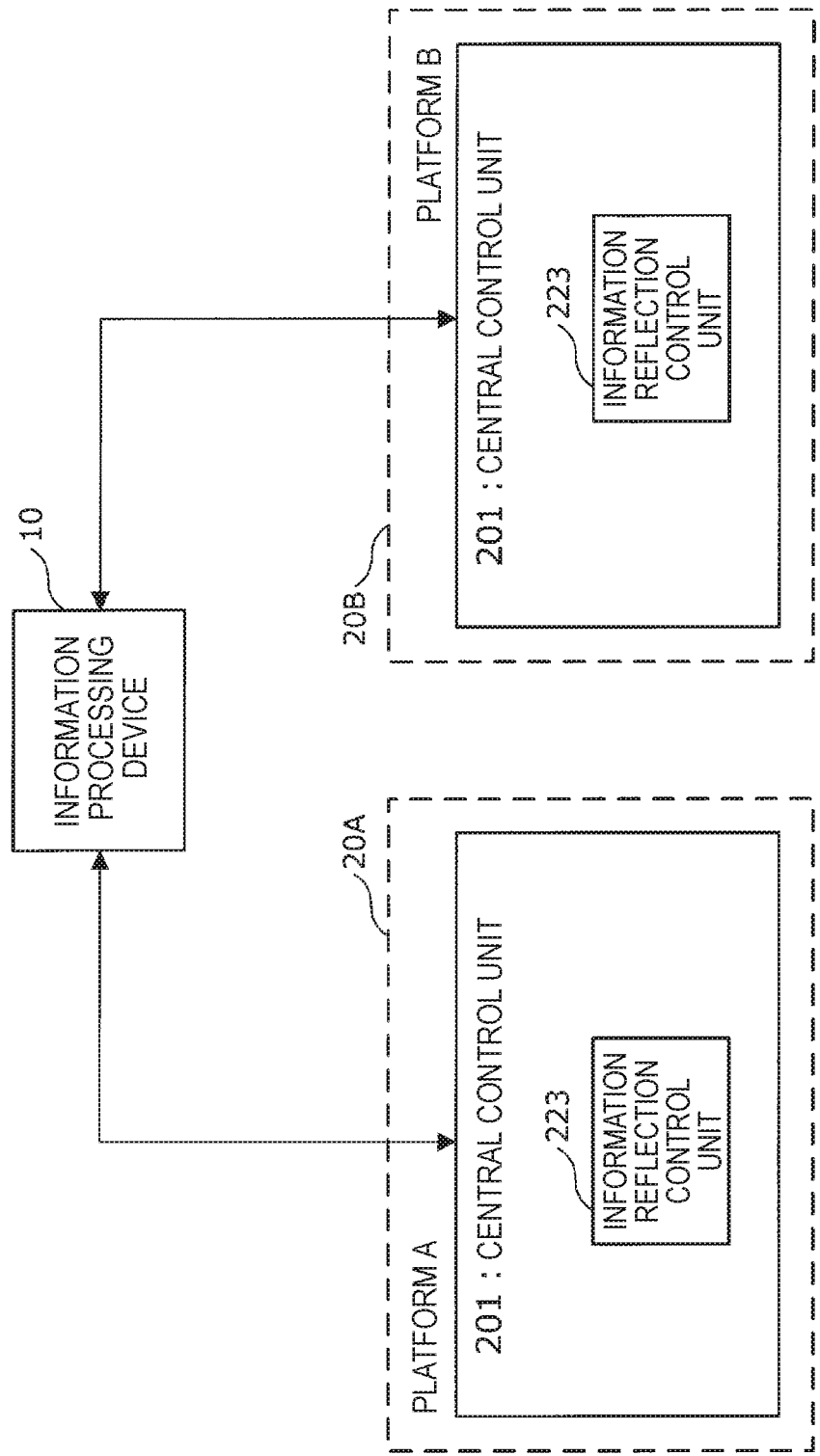

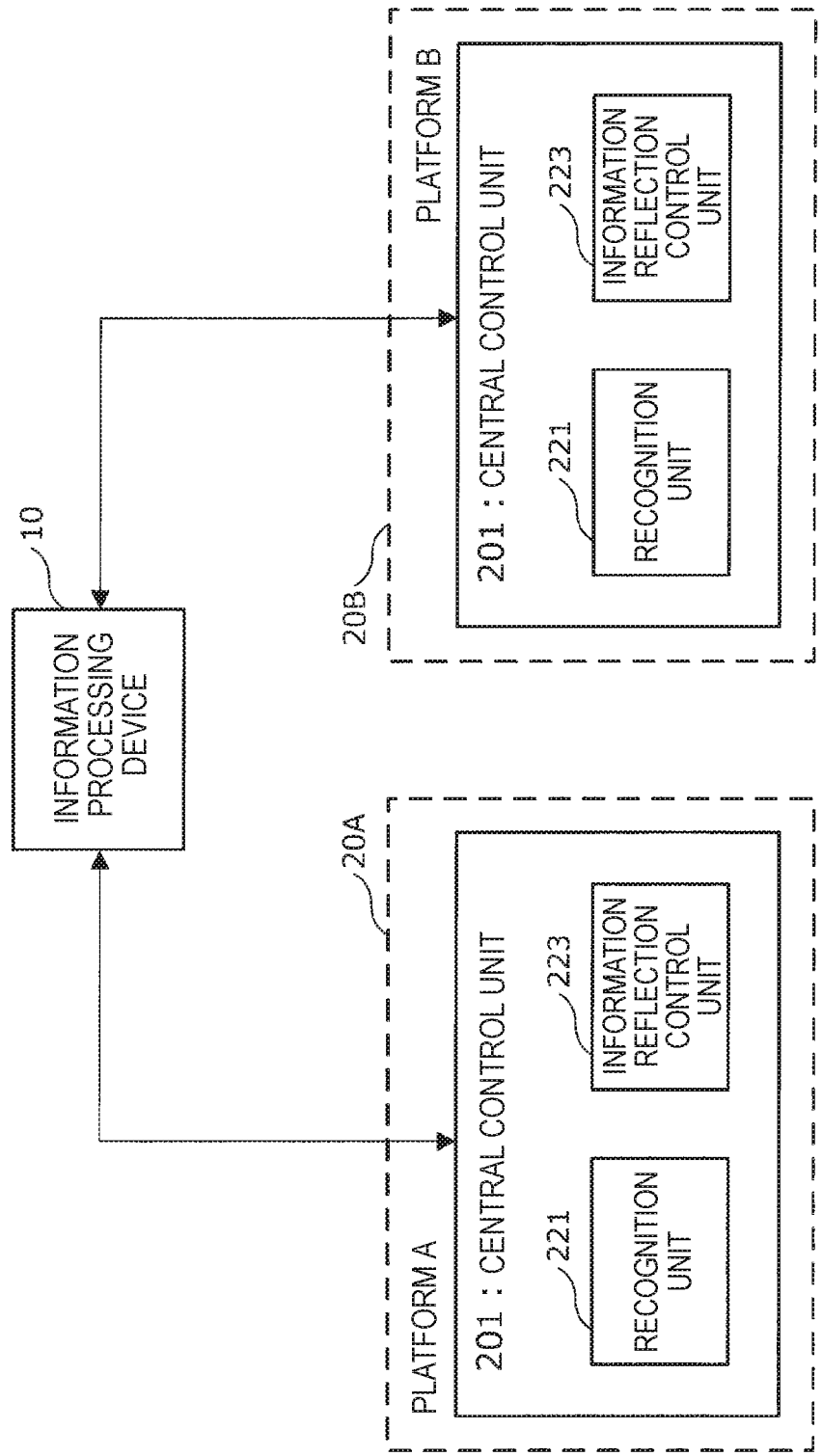

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/064641 filed on May 17, 2016, which claims priority benefit of Japanese Patent Application No. JP 2015-131164 filed in the Japan Patent Office on Jun. 30, 2015. Each of the above-referenced applications is hereby incorporated herein by reference in its entirety.

TECHNICAL FIELD

The present disclosure relates to an information processing device, an information processing method, and a program.

BACKGROUND ART

Recently, with the development of information processing technology, there has been remarkable progress in virtual reality (VR) technology, particularly in head-mounted display (HMD) technology. By applying HMD technology to a game, for example, and having a user wear an HMD on one's head, the user becomes able to experience an immersive game. In such a game, a more immersive experience is made possible by controlling the game using not only an ordinary game pad, but also bodily movements (for example, see Patent Literature 1 below).

CITATION LIST

Patent Literature

Patent Literature 1: JP 2012-79177A

DISCLOSURE OF INVENTION

Technical Problem

However, if these VR technologies are used, in a video sharing system that shares a video being viewed by a certain user with other users in remote locations, an online game, or the like, bodily movements are transmitted directly to the other users. For this reason, in cases in which a user involuntarily performs movements or the like which potentially make other users uncomfortable, there is a possibility that such movements will be transmitted to the other users.

For this reason, in the case of sharing information generated by performing bodily movements or the like with others, there is demand for technology capable of suppressing the transmission to others of information generated by inappropriate bodily movements or the like.

Accordingly, in the case of sharing information generated by performing bodily movements or the like with others, the present disclosure proposes an information processing device, an information processing method, and a program capable of suppressing the transmission to others of information generated by inappropriate bodily movements or the like.

Solution to Problem

According to the present disclosure, there is provided an information processing device, including: an acquisition unit that acquires a recognition result indicating at least one of a user movement or state recognized by a recognition unit utilizing a detection result from one or a plurality of sensors; and a control unit that, in a case of determining that the recognition result indicates a specific user movement or state, controls a degree of reflection in which information related to the specific user movement or state is reflected in notification information that transmits the information related to the specific user movement or state to a target different from the user, in accordance with the target.

In addition, according to the present disclosure, there is provided an information processing method, including: acquiring a recognition result indicating at least one of a user movement or state recognized by a recognition unit utilizing a detection result from one or a plurality of sensors; and controlling, in a case of determining that the recognition result indicates a specific user movement or state, a degree of reflection in which information related to the specific user movement or state is reflected in notification information that transmits the information related to the specific user movement or state to a target different from the user, in accordance with the target.

In addition, according to the present disclosure, there is provided a program for a computer able to acquire a recognition result by a recognition unit that recognizes at least one of a user movement or state utilizing a detection result from one or a plurality of sensors, the program causing the computer to realize: an acquisition function that acquires a recognition result recognized by the recognition unit and indicating at least one of a user movement or state; and a control function that, in a case of determining that the recognition result indicates a specific user movement or state, controls a degree of reflection in which information related to the specific user movement or state is reflected in notification information that transmits the information related to the specific user movement or state to a target different from the user, in accordance with the target.

According to the present disclosure, a recognition result indicating at least one of a user movement or state recognized by a recognition unit utilizing a detection result from one or a plurality of sensors is acquired; and in a case of determining that the recognition result indicates a specific user movement or state, a degree of reflection in which information related to the specific user movement or state is reflected in notification information that transmits the information related to the specific user movement or state to a target different from the user is controlled in accordance with the target.

Advantageous Effects of Invention

According to the present disclosure as described above, in the case of sharing information generated by performing bodily movements or the like with others, it is possible to suppress the transmission to others of information generated by inappropriate bodily movements or the like.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2A is an explanatory diagram that schematically illustrates an example of the functions of an information processing system according to the embodiment.

FIG. 2B is an explanatory diagram that schematically illustrates an example of the functions of an information processing system according to the embodiment.

FIG. 3 is a block diagram illustrating an example of a configuration of a platform that cooperates with an information processing device according to the embodiment.

FIG. 5A is an explanatory diagram illustrating an example of inappropriate information focused on by an information processing device according to the embodiment.

FIG. 5B is an explanatory diagram illustrating an example of inappropriate information focused on by an information processing device according to the embodiment.

FIG. 6 is an explanatory diagram illustrating a method of recognizing inappropriate information focused on by an information processing device according to the embodiment.

FIG. 14B is an explanatory diagram that schematically illustrates a modification of a platform according to the embodiment.

FIG. 14C is an explanatory diagram that schematically illustrates a modification of a platform according to the embodiment.

MODE(S) FOR CARRYING OUT THE INVENTION

Figure 1:
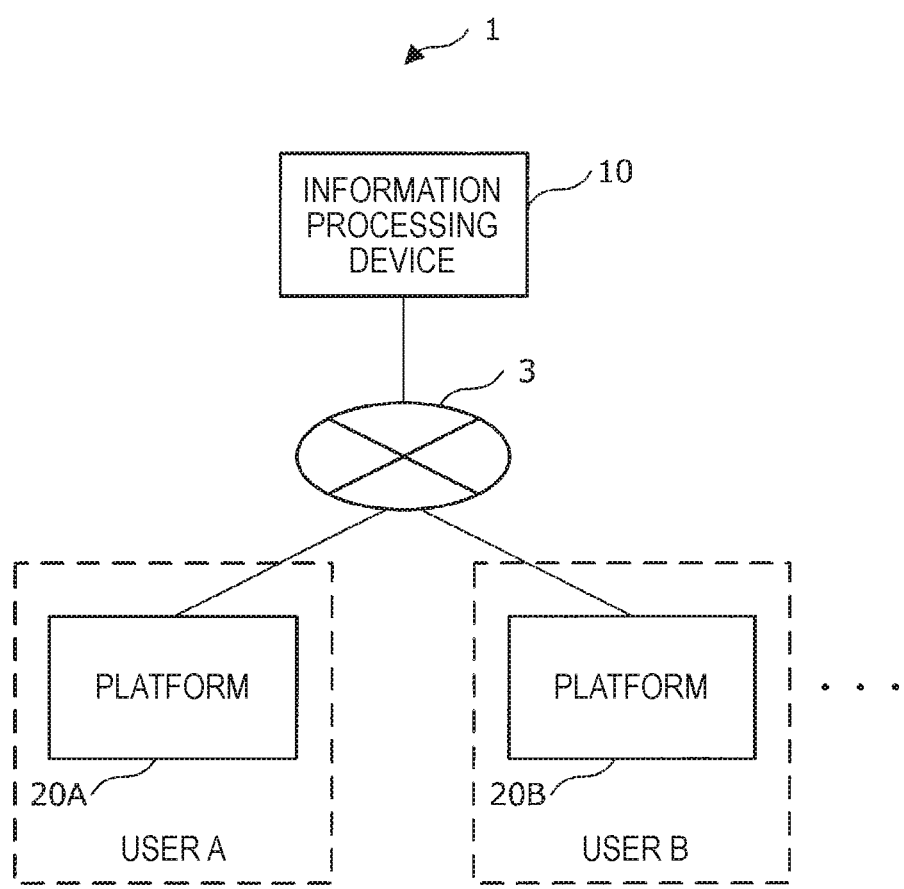
FIG. 1 is an explanatory diagram that schematically illustrates an information processing system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.
1. First Embodiment
  1.1. Information processing system
    1.1.1. Overall structure of information processing system
    1.1.2. Configuration of platform
  1.2. Information processing device
  1.3. Information processing method
  1.4. Modifications
2. Hardware configuration First Embodiment <Information Processing System>

First, a configuration of an information processing system according to a first embodiment of the present disclosure will be described briefly with reference to FIGS. 1 to 3.

FIG. 1 is an explanatory diagram that schematically illustrates an information processing system according to a first embodiment of the present disclosure. FIGS. 2A and 2B are explanatory diagrams that schematically explain an example of the functions of an information processing system according to the present embodiment. FIG. 3 is a block diagram illustrating an example of a configuration of a platform that cooperates with an information processing device according to the present embodiment.

[Overall Structure of Information Processing System]

As illustrated schematically in FIG. 1, the information processing system 1 according to the present embodiment is made up of an information processing device 10 and multiple platforms 20A, 20B, and so on (hereinafter, the multiple platforms may be designated the "platforms 20"), which are connected to each other over a public network 3 such as the Internet.

The information processing device 10 according to the present embodiment is a device that mediates the bidirectional transmission of information between users with regard to information being shared by multiple users via each of the platforms 20. As described in detail later, the information processing device 10 executes a certain application, such as an online game, for example, thereby creating a virtual space on the network 3. Via this virtual space, multiple users may share information. Also, as described in detail later, the information processing device 10 executes an application causing video data related to a space being viewed by a certain user to be shared with other users present in a remote location, thereby enabling multiple users to share information over the network 3.

The detailed configuration and functions of the information processing device 10 will be described in further detail later.

The platform 20 possessed by each user is a computer provided with hardware and software for sharing information via the respective applications implemented in the information processing device 10. Each user, by performing a user operation utilizing bodily movements or the like with respect to the platform 20, is able to share information with other users via the information processing device 10.

Note that although FIG. 1 illustrates a case in which two platforms 20 are connected to the information processing device 10 over the network 3, the number of platforms 20 connected to the information processing device 10 is not limited to two, and obviously three or more platforms 20 may also be connected to the information processing device 10.

Next, a specific example of a method of sharing information between users will be described briefly with reference to FIGS. 2A and 2B.

FIG. 2A schematically illustrates a system for the case in which the information processing device 10 executes what is called a user-immersive application such as an online game, and thereby constructs on the network 3 a virtual space such as the world in which the game is set. Via this virtual space, information is shared between users. In this case, the information processing device 10 executes a certain application to thereby construct the virtual space on the network 3. Also, each platform 20 executes a certain application that is able to connect to the application being executed by the information processing device 10, thereby enabling access to the virtual space constructed on the network 3, and enabling the sharing of information between users via this virtual space.

The users possessing each of the platforms 20 perform user operations utilizing bodily movements or the like, via components such as various sensors 21 and a head-mounted display 23, which are connected to the platform 20 in a wired or wireless manner. A bodily movement or the like performed by a user is detected by the various sensors 21, and information indicating a sensor detection result related to the user's movement, state, or the like is output to the information processing device 10. Also, the platform 20 is able to acquire information related to sensor detection results not only from the various sensors 21 directly connected to the platform 20, but also from various sensors in the surrounding environment, from which the platform 20 is able to acquire information over the network 3 or the like.

Examples of detection results related to the user's movement or state detected by the various sensors 21 are taken to include not only detection results related to the user's movement or state such as the user's bodily movements, the user's facial expressions, and biological information about the user such as a perspiration state and pulse, but also detection results related to the environment surrounding the user, such as smells, sounds, and vibrations of the user and the user's surroundings, for example.

The information processing device 10 according to the present embodiment recognizes the information indicating a sensor detection result related to the user's movement, state, or the like output from the platform 20, and causes a recognition result of such information to be reflected in the constructed virtual space. With this arrangement, other users become able to share in bodily movements performed by a user and correspondingly occurring phenomena in the virtual space.

Herein, the way in which the various sensors 21 and the head-mounted display 23 are implemented is not particularly limited. The various sensors 21 and the head-mounted display 23 may exist individually, or a head-mounted display 23 in which the various sensors 21 are built in may exist. Also, the devices by which a user performs input operations are not limited to devices such as the various sensors 21 and the head-mounted display 23, and any of various types of wearable devices are also usable as input devices.

In addition, specific examples of the various sensors 21 are not particularly limited, and may include, for example, any of various types of cameras, including range imaging cameras, infrared cameras, and the like, a motion sensor such as an acceleration sensor or a gyro sensor, an illuminance sensor, a barometric pressure sensor, an odor sensor, a sound sensor such as a microphone, a vibration sensor, and biological sensors capable of detecting various biological information, including perspiration, pulse, and the like.

FIG. 2B schematically illustrates a system for the case in which the information processing device 10 executes an application that shares video data between users. Via this application, information is shared between users. In this case, the information processing device 10 executes a certain application to thereby record imaging data related to a space being viewing by a user and transmitted from a certain platform 20, and also mediate intercommunication between the platforms 20. Additionally, each platform 20 executes a certain application to thereby share video data via the information processing device 10, and perform operations individually on video data.

Each of the users possessing each of the platforms 20 views a space in which the user exists while wearing the various sensors 21 connected to the platform 20 in a wired or wireless manner, thereby generating video data related to the space and other sensor detection data related to the space. Information indicating a sensor detection result related to the space being viewed by the user is output to the information processing device 10. With this arrangement, other users become able to share in various information related to the space being viewed by a certain user.

The above thus briefly describes an overall configuration of the information processing system 1 according to the present embodiment with reference to FIGS. 1 to 2B.

[Configuration of Platform]

Next, an example of the configuration of the platform 20 constituting the information processing system 1 according to the present embodiment will be described briefly with reference to FIG. 3. FIG. 3 is a block diagram illustrating an example of a configuration of a platform that cooperates with an information processing device according to the present embodiment.

As illustrated in FIG. 3, for example, the platform 20 according to the present embodiment mainly is provided with a central control unit 201, a sensor output acquisition unit 203, a communication control unit 205, an output control unit 207, and a storage unit 209.

The central control unit 201 is realized by components such as a central processing unit (CPU), read-only memory (ROM), and random access memory (RAM), for example. The central control unit 201 is a processing unit that centrally controls the various functions and operations executed in the platform 20. The central control unit 201 executes various applications stored in components such as the storage unit 209 described later, for example, and thereby can cause the platform 20 to realize a function corresponding to the application. At this time, the central control unit 201 executes various applications in the platform 20 while appropriately referencing information such as setting data stored in the storage unit 209 or the like.

The central control unit 201 acquires information about a user operation performed by bodily movements or the like acquired by the sensor output acquisition unit 203 described later, and controls the execution of an application in accordance with the user operation, while also outputting information related to the acquired sensor output results to the information processing device 10 via the communication control unit 205 described later. Also, the central control unit 201 causes output from the information processing device 10 acquired via the communication control unit 205 to be reflected in the execution of an application, while also outputting application execution results to the user via the output control unit 207 described later.

The sensor output acquisition unit 203 is realized by components such as a CPU, ROM, RAM, an input device, and a communication device, for example. The sensor output acquisition unit 203 acquires sensor output data related to at least one of the user's movement or state detected by the various sensors 21 as described above. The sensor output data from the various sensors 21 acquired by the sensor output acquisition unit 203 is output to the central control unit 201, and used to control the various applications being executed by the central control unit 201. Also, the sensor output data is output to the information processing device 10 via the central control unit 201 and the communication control unit 205.

The communication control unit 205 is realized by components such as a CPU, ROM, RAM, and a communication device, for example. The communication control unit 205 is a processing unit that controls communication between the platform 20 and the information processing device 10 over the network 3. Via the communication control unit 205, the central control unit 201 becomes able to output various types of data and information, such as sensor output data and application setting data set by the user, to the information processing device 10, and additionally acquire various types of data and information from the information processing device 10.

The output control unit 207 is realized by components such as a CPU, ROM, RAM, an output device, and a communication device, for example. The output control unit 207 is a processing unit that controls the outputting of various types of data and information output from the central control unit 201 to output devices capable of transmitting sensory information to the user. Such output devices may be, for example, the various sensors 21 or the like, the head-mounted display 23, any of various types of a display 25, and other output devices 27, such as speakers and a tactile display, which are connected to the platform 20. With this arrangement, an execution result of an application executed by the central control unit 201 is provided to the user.

The storage unit 209 is realized by components such as RAM and a storage device provided in the platform 20 according to the present embodiment, for example. In the storage unit 209, information such as various parameters and the partial results of processes that need to be saved when the platform 20 according to the present embodiment conducts some kind of process, or other information such as various databases and programs, are recorded as appropriate. Particularly, in the storage unit 209, information such as entity data related to an application for cooperating with an application executed by the information processing device 10, setting data set for such an application by the user, and the like is recorded. Components such as the central control unit 201, the sensor output acquisition unit 203, the communication control unit 205, and the output control unit 207 are able to conduct data read/write processes freely on the storage unit 209 in which such various information is stored.

The above thus illustrates an example of the functions of the platform 20 according to the present embodiment. Each of the above component elements may be realized using general-purpose members or circuits, but may also be realized in hardware specialized in the function of each component element. Additionally, the functions of each of the component elements may also be conducted entirely by a CPU or the like. Consequently, it is possible to appropriately modify the configuration to be used according to the technological level at the time of carrying out the present embodiment.

Note that it is also possible to develop a computer program for realizing the respective functions of a platform according to the present embodiment as described above, and implement the computer program in a personal computer or the like. In addition, a computer-readable recording medium storing such a computer program may also be provided. The recording medium may be a magnetic disk, an optical disc, a magneto-optical disc, or flash memory, for example. Furthermore, the above computer program may also be delivered via a network, for example, without using a recording medium.

The above thus briefly describes the information processing system 1 according to the present embodiment with reference to FIGS. 1 to 3.

<Information Processing Device>

Next, an information processing device according to the present embodiment will be described in detail with reference to FIGS. 4 to 12B.

Figure 4:
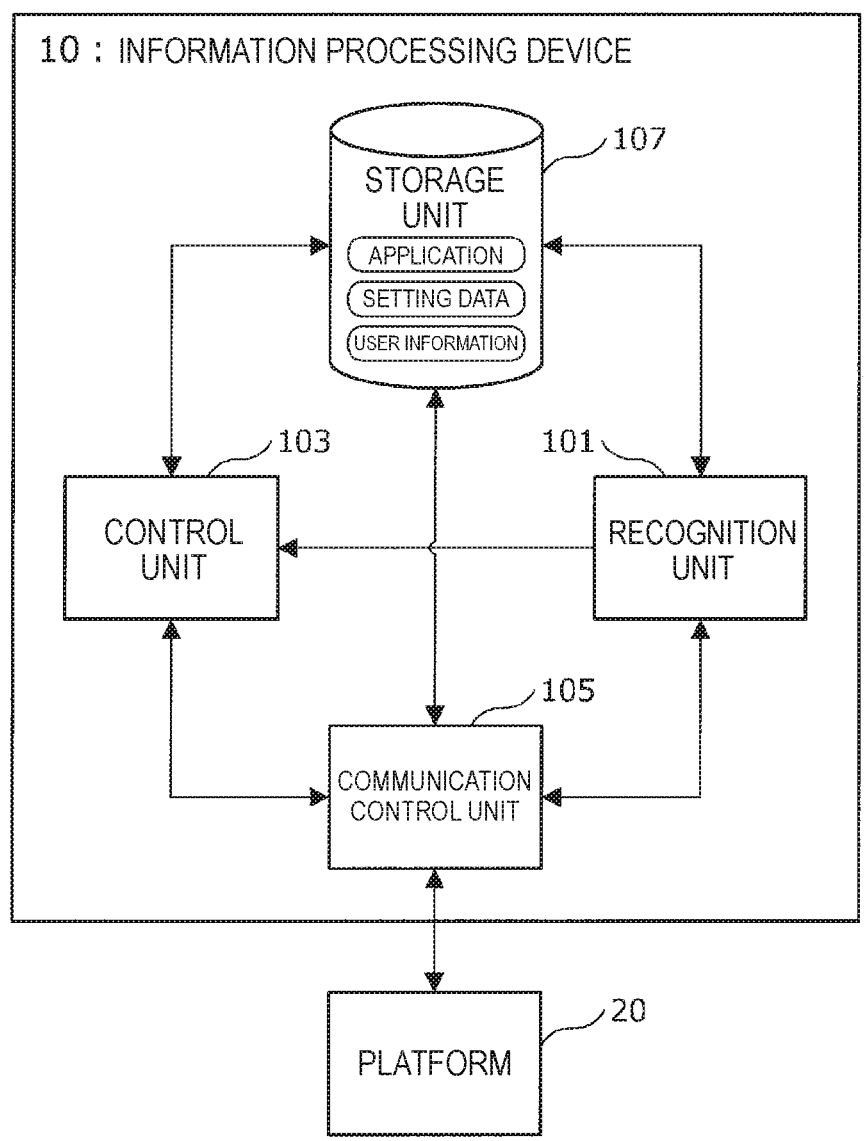
FIG. 4 is a block diagram illustrating an example of a configuration of an information processing device according to the embodiment.
Figure 7:
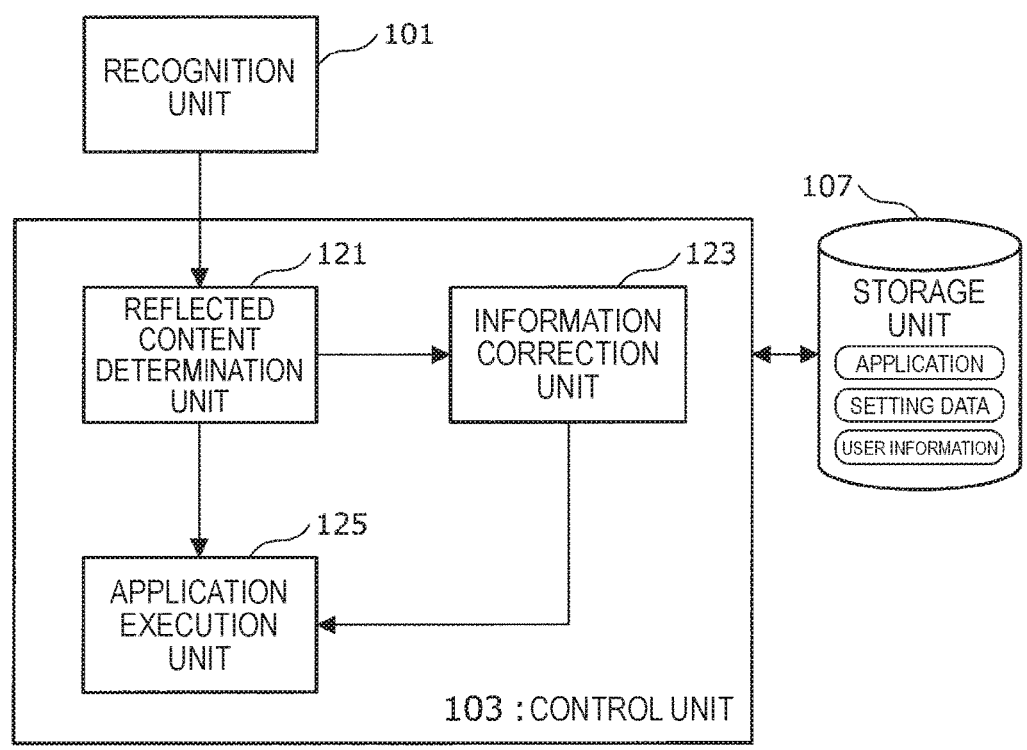
FIG. 7 is a block diagram illustrating an example of a configuration of a control unit provided in an information processing device according to the embodiment.
Figure 8:
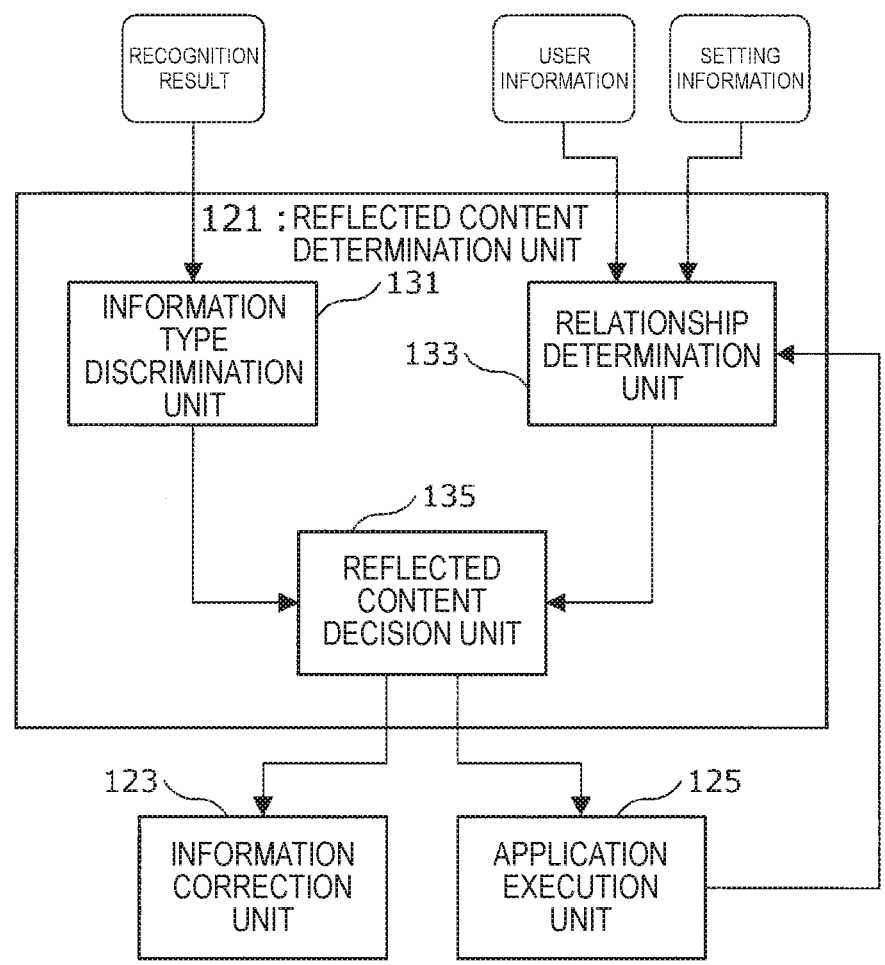
FIG. 8 is a block diagram illustrating an example of a configuration of a reflected content determination unit provided in an information processing device according to the embodiment.
Figure 9:
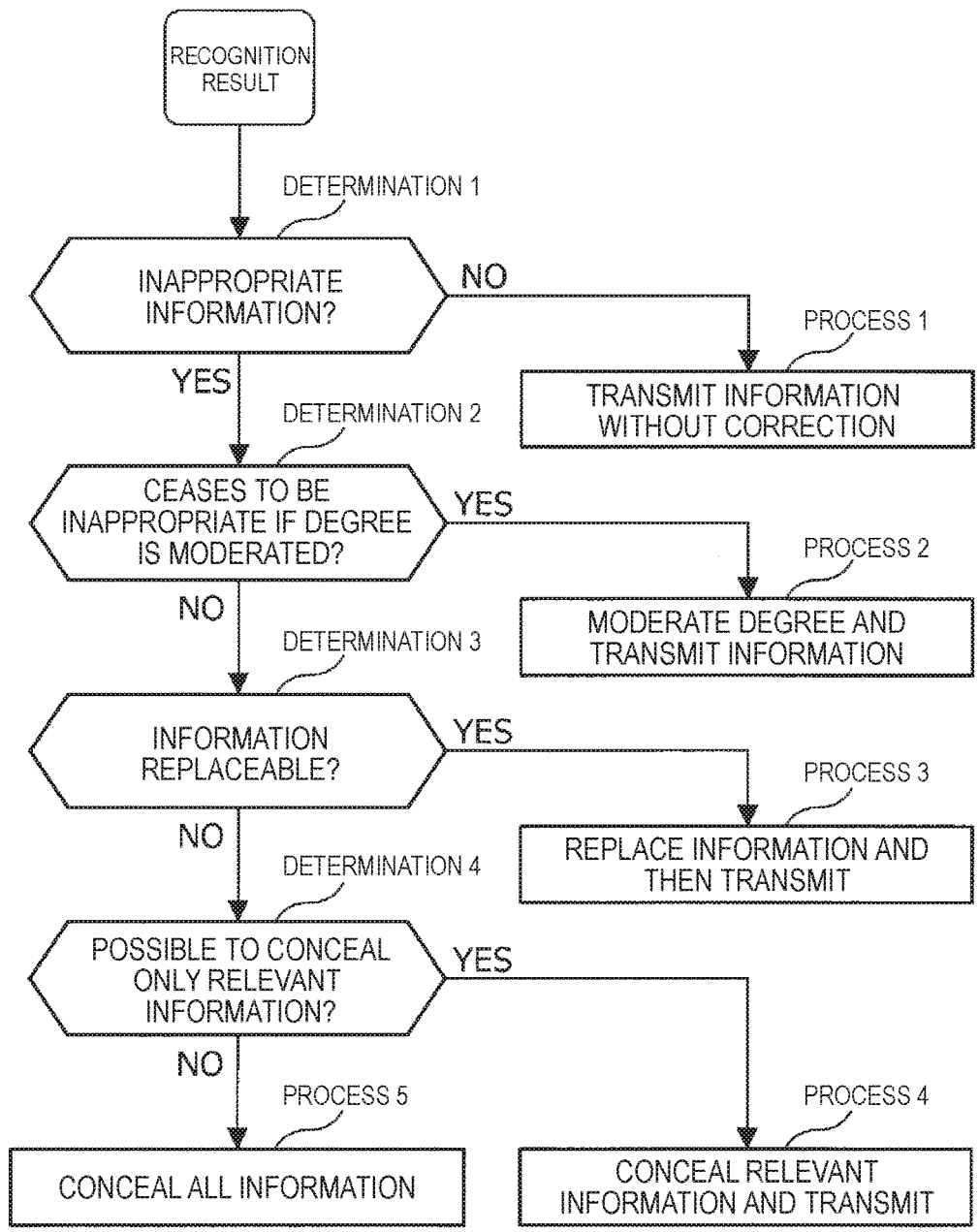
FIG. 9 is an explanatory diagram for explaining a determination process in a reflected content determination unit according to the embodiment.
Figure 10A:
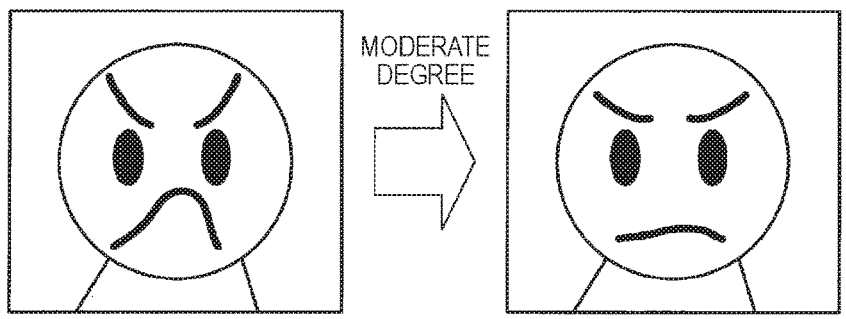
FIG. 10A is an explanatory diagram for explaining an example of an information correction process in an information correction unit provided in an information processing device according to the embodiment.
Figure 10B:
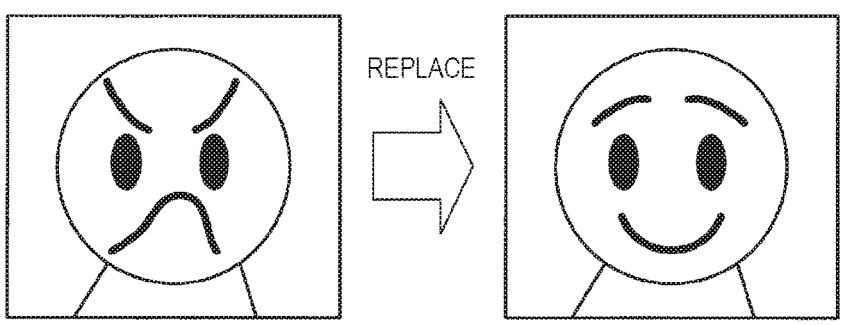
FIG. 10B is an explanatory diagram for explaining an example of an information correction process in an information correction unit provided in an information processing device according to the embodiment.
Figure 10C:
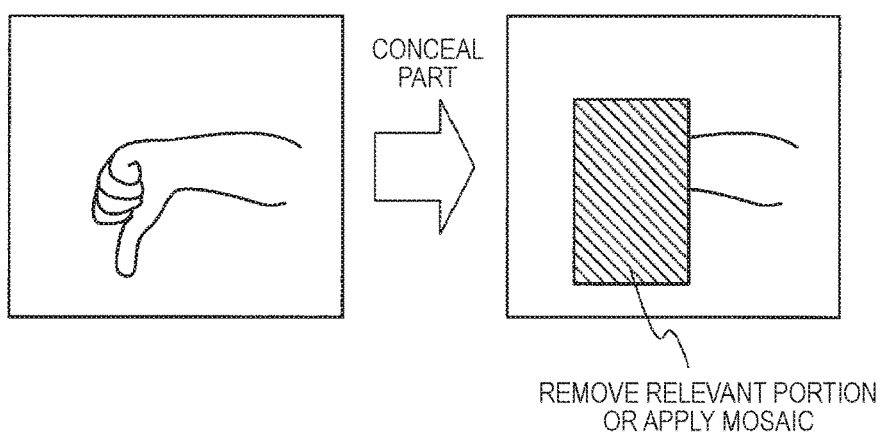
FIG. 10C is an explanatory diagram for explaining an example of an information correction process in an information correction unit provided in an information processing device according to the embodiment.
Figure 11:
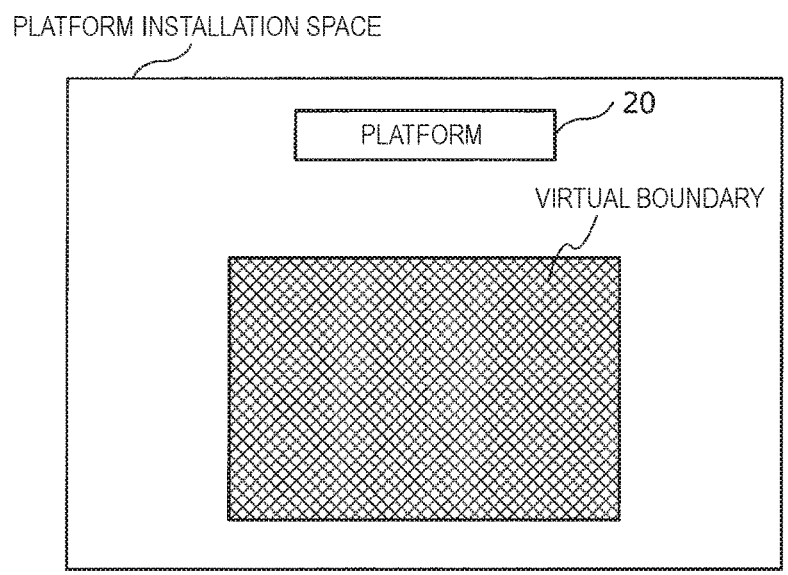
FIG. 11 is an explanatory diagram for explaining another example of a reflected content determination unit in an information processing device according to the embodiment.
Figure 12A:
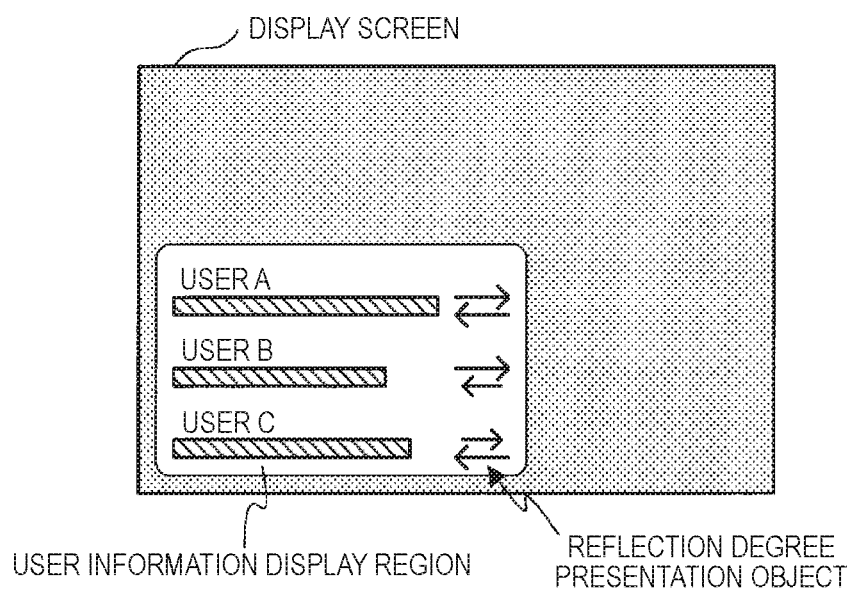
FIG. 12A is an explanatory diagram that schematically illustrates an example of a display screen in an information processing system according to the embodiment.
Figure 12B:
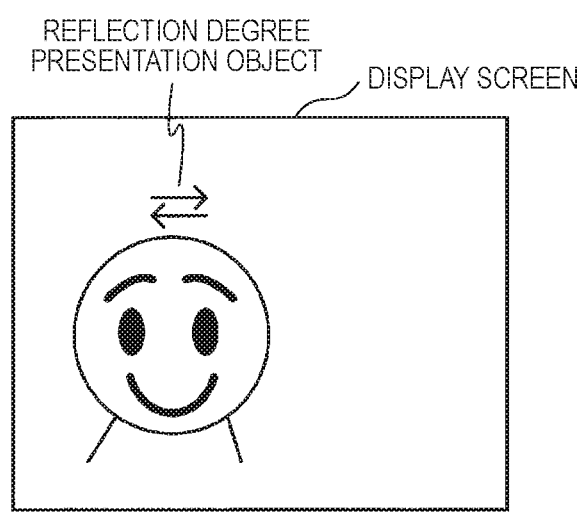
FIG. 12B is an explanatory diagram that schematically illustrates an example of a display screen in an information processing system according to the embodiment.

FIG. 4 is a block diagram illustrating an example of a configuration of an information processing device according to the present embodiment. FIGS. 5A and 5B are explanatory diagrams illustrating an example of inappropriate information focused on by an information processing device according to the present embodiment. FIG. 6 is an explanatory diagram illustrating a method of recognizing inappropriate information focused on by an information processing device according to the present embodiment. FIG. 7 is a block diagram illustrating an example of a configuration of a control unit provided in an information processing device according to the present embodiment, while FIG. 8 is a block diagram illustrating an example of a configuration of a reflected content determination unit provided in an information processing device according to the present embodiment. FIG. 9 is an explanatory diagram for explaining a determination process in a reflected content determination unit according to the present embodiment. FIGS. 10A to 10D are explanatory diagrams for explaining an example of an information correction process in an information correction unit provided in an information processing device according to the present embodiment. FIG. 11 is an explanatory diagram for explaining another example of a reflected content determination unit in an information processing device according to the present embodiment. FIGS. 12A and 12B are explanatory diagrams that schematically illustrate an example of a display screen in an information processing system according to the present embodiment.

The information processing device 10 according to the present embodiment is a device that executes various types of applications, such as various game applications such as an online game, and the video sharing application described earlier, for example, to thereby enable the sharing of various information between users operating the platforms 20. Users perform input operations with bodily movements or the like with respect to the platforms 20, but there is a possibility of a user intentionally or unintentionally performing a movement that makes other users uncomfortable, or a dangerous movement by which the individual user could be identified. Accordingly, the information processing device 10 according to the present embodiment collectively considers movements which could make other users uncomfortable and dangerous movements as described above to be inappropriate movements or the like, and automatically recognizes whether or not a user has performed a bodily movement corresponding to an inappropriate movement. In addition, in a case in which an inappropriate movement as described above is performed by a user, the information processing device 10 according to the present embodiment applies an appropriate correction to the information corresponding to the inappropriate movement, and then shares the corrected information with other users.

As illustrated in FIG. 4, the information processing device 10 according to the present embodiment that realizes functions like the above mainly is provided with a recognition unit 101, a control unit 103, a communication control unit 105, and a storage unit 107.

The recognition unit 101 according to the present embodiment is realized by components such as a CPU, ROM, and RAM, for example. The recognition unit 101 utilizes a detection result from one or multiple sensors that detect at least one of the user's movement or state, and recognizes at least one of the user's movement or state. Such a sensor detection result related to at least one of the user's movement or state used in the recognition process is transmitted from the platform 20 and acquired via the communication control unit 105 described later.

The recognition unit 101 utilizes the sensor detection result related to at least one of the user's movement or state transmitted from the platform 20 to reference a database or the like regarding associations between sensor detection results and the user's movement or state, and recognizes the user's movement and state from the sensor detection result.

At this point, by a recognition process like the above, the recognition unit 101 also determines whether or not an inappropriate movement or the like described earlier has been performed by the user. Hereinafter, inappropriate movements or the like will be described more specifically with reference to FIGS. 5A and 5B.

As illustrated in FIGS. 5A and 5B, inappropriate movements or the like focused on the recognition unit 101 can be classified roughly into the user's bodily movements, the user's facial expressions, movements or the like related to the sense of sight, movements or the like related to the sense of touch, movements or the like related to the sense of hearing, movements or the like related to the sense of smell, the user's biological information, the user's personal information, and so on.

As illustrated in FIG. 5A, inappropriate movements or the like in association with the user's bodily movements may be the user's personal habits, movements unrelated to the application, unpleasant physiological phenomena, physiological phenomena which are not particularly unpleasant, insulting movements, nuisance movements, and the like.

Personal habits correspond to information which the user generally does not want other people to know about, and from the perspective of other people, information that people would rather not see. Also, in the case of certain personally characteristic habits, there is a possibility of an individual being identified. Such personal habits are not particularly limited, but may include movements such as fidgeting, body swaying, and touching a specific part of the body, for example.

If movements unrelated to the application are conducted by a certain user while sharing information, there is a possibility that people who feel uncomfortable may exist among the other people sharing in the information. Such movements unrelated to the application are also not particularly limited, but may include movements such as touching a device unrelated to the application, such as a smartphone, or eating a snack, for example.

Unpleasant physiological phenomena should be treated as inappropriate movements or the like because there are people who feel uncomfortable due to such phenomena. Such unpleasant physiological phenomena are not particularly limited, but may include physiological phenomena such as burping and farting, for example. Additionally, although physiological phenomena such as hiccups and yawns are not unpleasant physiological phenomena, if other people perform such movements, the user may be bothered. Also, such physiological phenomena such as hiccups and yawns are movements that the user wants to hide from other people if possible.

Also, movements as typified by the middle-finger hand gesture and behaviors such as impersonating another person are to be avoided as movements that insult the other person. Also, movements such as following another person in the virtual space or continually repeating the same movement, for example, are nuisance movements. Such movements are movements that typically make other people feel unpleasant.

Meanwhile, as illustrated in FIG. 5A, inappropriate movements or the like related to the user's facial expressions include the user's crying face, a bored-looking face, and an angry-looking face, for example.

Since the user may not want other people to see oneself crying, it is preferable to treat a crying face as an inappropriate movement. Also, if the user makes a bored-looking face while sharing information, other people will feel unpleasant, and the user will feel unpleasant if other people become angry. Consequently, it is preferable to treat such bored-looking and angry-looking faces as inappropriate movements.

As illustrated in FIG. 5B, inappropriate movements or the like related to the sense of sight include movements of directing one's gaze at a specific target or darting one's gaze around, for example. Since the object of the user's interest or concern can be inferred from the movement of directing one's gaze at a specific target, in an online game or the like, for example, if the user performs such a movement with respect to another character or the like, and the direction of the gaze is grasped by other people, another user may feel uncomfortable. Also, there is a possibility of being personally identified from darting one's gaze around, which is not preferable.

As illustrated in FIG. 5A, movements or the like related to the sense of touch include vibrations that exceed a certain strength and movements in association with continuous vibration. If vibrations that exceed a certain strength and continuous vibrations are shared with other people, there is a possibility of the other people feeling uncomfortable due to such vibrations. For this reason, it is preferable for such movements to be treated as inappropriate movements or the like.

Inappropriate movements or the like related to the sense of hearing include mastication sounds, for example. If a certain user eats while in the middle of sharing information via the application, it is conceivable that mastication sounds will be detected. However, since mastication sounds are typically thought be unpleasant, it is preferable for such sounds to be treated as inappropriate movements or the like.

As illustrated in FIG. 5B, inappropriate movements or the like related to the sense of smell include smells such as body odor or the scent of perfume, and home odors or the smells of cooking. If such smells are shared with other people, there is a possibility that such smells will make some of the other users uncomfortable. Consequently, it is preferable for such smells to be treated as inappropriate movements or the like.

As illustrated in FIG. 5B, inappropriate movements or the like related to biological information include the user's perspiration state and pulse. For example, in an online game or the like, if even the user's perspiration state is reproduced, it becomes possible to lend even greater reality to the virtual space, but there is also a possibility that some of the other people will feel uncomfortable. Also, few people are thought to feel uncomfortable by the sharing of a certain user's pulse, but by analyzing the pulse, there is a possibility of a disease that afflicts the user being identified or the user's age being identified, which is not preferable. Consequently, it is preferable for such biological information to be treated as inappropriate movements or the like.

Note that since recent technological developments had led to significant progress being recognized in technology for transmitting the senses and touch and smell as well as in technology for transmitting biological information, in the present embodiment, the sense of touch, the sense of smell, and biological information as described above is also focused on as inappropriate movements or the like.

As illustrated in FIG. 5B, inappropriate movements related to personal information include information related to the user's living environment, the user's name, and the like. For example, in the case in which noise or the like is detected around the user's residence, there is a possibility of the user's residence being identified. Also, in cases such as when one of the user's family members calls out the user by name or an object on which the user's name is written is depicted while in the middle of sharing information with other users via the application, for example, there is a possibility of the user's name being transmitted to other people. Accordingly, it is preferable for such information to be treated as inappropriate movements or the like.

Also, the information illustrated in FIGS. 5A and 5B is merely one example, and movements or the like other than those illustrated in FIGS. 5A and 5B may be treated as inappropriate movements or the like.

To recognize inappropriate movements or the like as illustrated in FIGS. 5A and 5B, the recognition unit 101 according to the present embodiment is able to use recognition techniques as illustrated in FIG. 6.

For example, as a recognition technique A, the recognition unit 101 is able to utilize a camera detection result. In other words, the recognition unit 101 is able to utilize a detection result from tracking the user's motion, and by determining whether or not a target object has entered into a target region, recognize whether or not a "personal habit" or a "movement unrelated to the application" has occurred.

As a recognition technique B, the recognition unit 101 is able to utilize a detection result from motion sensors such as an acceleration sensor and a gyro sensor. In other words, the recognition unit 101 is able to determine the user's motion from detection results from these motion sensors. Additionally, the recognition unit 101 is able to utilize motion sensor detection results to learn the user's motions by what is called a machine learning process, and thereby predict and estimate a target movement. Note that the details of the motion determination process and the machine learning process are not particularly limited, and it is possible to utilize commonly known technology. By such a recognition process, the recognition unit 101 is able to recognize whether or not a "personal habit", a "movement unrelated to the application", an "unpleasant physiological phenomenon", a "physiological phenomenon which is not particularly unpleasant", an "insulting movement", a "nuisance movement", or the like has occurred, for example.

As a recognition technique C, the recognition unit 101 is able to utilize a camera detection result. In other words, the recognition unit 101 is able to match a captured image that images the user's motion with an image of an inappropriate activity or the like, and perform recognition in accordance with the similarity of the matching. Such a matching process is not particularly limited, and it is possible to utilize a commonly known matching process. By such a recognition process, the recognition unit 101 is able to recognize whether or not a movement or the like corresponding to a "personal habit", a "movement unrelated to the application", an "insulting movement", a "crying face", a "bored-looking face", an "angry-looking face", or a "name" has been performed, for example.

As a recognition technique D, the crossing point detector 101 is able to utilize detection results from environmental sensors existing around the platform 20, and recognize a movement about to be performed, information about to be produced, or the like. For example, on the basis of a detection result from a kitchen illuminance sensor in the user's residence, it is possible to recognize a series of movements and states, such as cooking movements about to be performed, and in addition, cooking-related smells about to be produced. In addition, by such a recognition technique, the recognition unit 101 becomes able to recognize whether or not a movement or the like corresponding to "information about the living environment" or the like has been performed, for example.

As a recognition technique E, the recognition unit 101 is able to utilize a detection result from an odor sensor. In other words, the recognition unit 101 is able to utilize a detection result from an odor sensor to analyze produced odors, and sense whether or not a specific odor has been produced. By such a recognition process, the recognition unit 101 becomes able to recognize whether or not a movement or the like corresponding to "body odor or the scent of perfume", "home odors or the smells of cooking", or the like has been performed, for example.

As a recognition technique F, the recognition unit 101 is able to utilize a detection result from a motion sensor or camera, and perform recognition on the basis of whether or not a feature from an acceleration sensor or a camera image repeats a certain value. By such a recognition process, the recognition unit 101 becomes able to recognize whether or not a movement or the like corresponding to a "nuisance movement" or the like has been performed, for example.

As a recognition technique G, the recognition unit 101 is able to perform a recognition process utilizing a detection result from a microphone. In other words, the recognition unit 101 is able to learn or set in advance a specific wavelength or spectrum of unpleasant sound, and perform a sound-related recognition process by comparing a sound input as a microphone detection result to the learned/recognized content. With this arrangement, the recognition unit 101 becomes able to recognize whether or not a movement or the like corresponding to "mastication sounds", "information about the living environment", "name", or the like has occurred.

As a recognition technique H, the recognition unit 101 is able to perform a recognition process utilizing a detection result from a vibration sensor. In other words, the recognition unit 101 is able to preset a threshold value related to a maximum amplitude or an average amplitude value within a certain time for a wavelength, and then perform a recognition process related to the sense of touch on the basis of whether or not the maximum amplitude or average amplitude value for a wavelength computed from a vibration sensor detection result exceeds a set threshold value. With this arrangement, the recognition unit 101 becomes able to recognize whether or not a movement or the like corresponding to "vibration that exceeds a certain strength or continuous vibration" or the like has occurred.

As recognition technique I and J, the recognition unit 101 is able to perform a recognition process utilizing a detection result from a biological sensor. In other words, the recognition unit 101 becomes able to specify a perspiration amount from a detection result from a biological sensor (particularly, a perspiration sensor), and on the basis of whether or not a certain threshold value is exceeded, recognize whether or not a movement or the like corresponding to "perspiration" has occurred. Additionally, the recognition unit 101 becomes able to analyze features from a detection result from a biological sensor (particularly, a pulse sensor), and on the basis of whether or not a certain feature, such as age or disease, is included, recognize whether or not a movement or the like corresponding to "pulse" has occurred.

As a recognition technique K, the recognition unit 101 is able to perform a recognition process utilizing a detection result from a camera. In other words, the recognition unit 101 becomes able to estimate a gaze position from a camera detection result (that is, a captured image) according to a commonly known method, and determined the direction of the gaze. Herein, it is possible to estimate a gaze position by a commonly known machine learning process. By conducting such a recognition process, the recognition unit 101 becomes able to recognize whether or not a movement or the like corresponding to "directing one's gaze at a specific target", "darting one's gaze around", or the like has occurred, for example.

In addition, the recognition unit 101 is able to conduct various recognition processes by appropriately combining several of the recognition techniques A to K as illustrated in FIG. 6. Furthermore, the recognition unit 101 is able to utilize commonly known recognition techniques other than the recognition techniques A to K as illustrated in FIG. 6 to recognize various movements, circumstances, states, and the like.

After conducting processes like the above to recognize a movement, state, or the like of the user operating the platform 20 on the basis of sensor detection results, the recognition unit 101 outputs information related to the obtained recognition result to the control unit 103.

Returning again to FIG. 4, the control unit 103 provided in the information processing device 10 according to the present embodiment will be described in detail.

The control unit 103 is realized by components such as a CPU, ROM, and RAM, for example. The control unit 103 centrally controls the functions and operations of the information processing device 10 according to the present embodiment. Also, in the case in which a specific user movement or state is detected by the recognition unit 101, the control unit 103 controls the degree of reflection, which is the degree in which the information related to the specific user movement or state is to be reflected in notification information transmitted to a different target from the user focused on by the information related to the detected specific user movement or state, in accordance with the target.

More specifically, the control unit 103 corrects the content of the information related to the recognized user movement or state in accordance with a recognition result from the recognition unit 101, and causes information related to the corrected user movement or state to be reflected in the notification information. In other words, the control unit 103 may select any correction from (a) to (d), which includes (a) to moderate the content of the information related to the user movement or state, (b) to replace the content of the information related to the user movement or state with other content, (c) to conceal a portion of the content of the information related to the user movement or state, and (d) to conceal all of the content of the information related to the user movement or state.

The control unit 103 that performs such a process includes a reflected content determination unit 121, an information correction unit 123, and an application execution unit 125, as illustrated schematically in FIG. 7, for example.

The reflected content determination unit 121 is realized by components such as a CPU, ROM, and RAM, for example. The reflected content determination unit 121 is a processing unit that references information related to a recognition result output from the recognition unit 101, recognizes what kind of bodily movements or the like have been performed by the user of the platform 20 being focused on, and in accordance with the bodily movements or the like performed by the user, and determines to what degree information corresponding to the bodily movements or the like is to be reflected with respect to a target other than the user being focused on.

Herein, the target other than the user being focused on may be, for example, another user utilizing an application that provides a virtual space shared among multiple users, the virtual space itself, or another user utilizing an application that provides a video sharing function of sharing a video of a space being viewed by a first user with a second user.

The reflected content determination unit 121 references information related to a recognition result output from the recognition unit 101, and in the case in which inappropriate movements or the like as illustrated in FIGS. 5A and 5B are not being performed, the reflected content determination unit 121 determines that the information may be reflected without correction with respect to a target other than the user being focused on. Moreover, the reflected content determination unit 121 outputs the information related to the recognition result output from the recognition unit 101 to the application execution unit 125 described later as-is, and causes the information to be reflected in the execution of the application.

Also, the reflected content determination unit 121 references information related to a recognition result output from the recognition unit 101, and in the case in which inappropriate movements or the like as illustrated in FIGS. 5A and 5B are being performed, the reflected content determination unit 121 determines the degree to which the information is to be reflected with respect to a target other than the user being focused on, in accordance with the performed inappropriate movements or the like. Moreover, the reflected content determination unit 121 outputs information indicating the degree of reflection on notification information to be notified with respect to a target other than the user being focused on, and the information related to the recognition result output from the recognition unit 101, to the information correction unit 123 described later, and causes the information including inappropriate movements or the like to be corrected appropriately.

The reflected content determination unit 121 that performs such processes includes an information type discrimination unit 131, a relationship determination unit 133, and a reflected content decision unit 135, an example of which is illustrated in FIG. 8, for example.

The information type discrimination unit 131 is realized by components such as a CPU, ROM, and RAM, for example. The information type discrimination unit 131 references a recognition result output from the recognition unit 101, and first determines whether or not inappropriate movements or the like as illustrated in FIGS. 5A and 5B have been performed. In the case of determining that inappropriate movements or the like have not been performed, the information type discrimination unit 131 notifies the reflected content decision unit 135 described later of the determination.

On the other hand, in the case of determining that an inappropriate movement or the like has been performed, the information type discrimination unit 131 determines the type of information expressing the performed inappropriate movement or the like. In other words, the information type discrimination unit 131 references information indicating the recognition result related to the performed inappropriate movement or the like, and determines which of the following four categories the relevant inappropriate movement or the like belongs to.

(1) A movement or the like that ceases to be inappropriate if the degree of the inappropriate movement or the like is moderated (2) A movement or the like in which the portion corresponding to the inappropriate movement or the like is replaceable with an appropriate movement or the like (3) A movement or the like for which it is possible to conceal only the portion corresponding to the inappropriate movement or the like (4) A movement or the like for which it is not possible to conceal only the portion corresponding to the inappropriate movement or the like The determination process into four categories as above is conducted in a flow as illustrated in FIG. 9, for example. In other words, the information type discrimination unit 131 references information related to the recognition result, and first determines whether information related to an inappropriate movement or the like is included (Determination 1). At this point, in the case of determining that information related to an inappropriate movement or the like is not included, the information type discrimination unit 131 determines that it is sufficient to transmit the information related to the recognition result to other people without correcting the information (Process 1).

On the other hand, in the case in which information related to an inappropriate movement or the like is included, the information type discrimination unit 131 next determines whether or not the movement or the like ceases to be inappropriate if the degree of information related to the inappropriate movement or the like is moderated (Determination 2). At this point, "moderating the degree" means an operation in which, when an inappropriate movement or the like is considered as a vector quantity, for example, the direction of the vector is kept the same while the magnitude of the vector is decreased, such as softening the degree of facial expression in the case in which an inappropriate movement or the like related to a facial expression has been conducted (for example, as illustrated in FIG. 10A, correcting a fiercely angry facial expression to a slightly angry facial expression) or the like, for example. In the case of determining that the information ceases to be inappropriate if the degree is moderated, the information type discrimination unit 131 determines that the recognition result being focused on is information categorized into (1) above, and determines that it is sufficient to moderate the degree and transmit the information to other people (Process 2).

On the other hand, in the case of determining that the movement or the like does not cease to be inappropriate even if the degree is moderated, as with an "insulting movement", for example, the information type discrimination unit 131 determines whether or not the information expressing the inappropriate movement or the like is replaceable (Determination 3). At this point, "replacing" means an operation in which, when an inappropriate movement or the like is considered as a vector quantity, for example, the direction itself of the vector is changed, such as changing the facial expression itself in the case in which an inappropriate movement or the like related to a facial expression has been conducted (for example, as illustrated in FIG. 10B, replacing a fiercely angry facial expression with a smiling facial expression) or the like, for example. In the case of determining that the information is replaceable, the information type discrimination unit 131 determines that the recognition result being focused on is information categorized into (2) above, and determines that it is sufficient to replace and transmit the information to other people (Process 3).

On the other hand, in the case of determining that the inappropriate movement or the like is not replaceable because no replaceable information exists or the like, the information type discrimination unit 131 determines whether or not it is possible to conceal only the information expressing the inappropriate movement or the like (Determination 4). For example, as illustrated in FIG. 10C, consider the case in which a hand gesture corresponding to an "insulting movement" is performed as a bodily movement. At this time, in the case in which a mosaic is applied to only the portion corresponding to the hand gesture, or the portion corresponding to the hand gesture is removed, but information is still conveyed as the information related to the user's movement or the like as a whole, the information type discrimination unit 131 determines that the recognition result being focused on is information categorized into (3) above, and determines that it is sufficient to conceal the information of the relevant portion before transmitting to other people (Process 4).

Figure 10D:
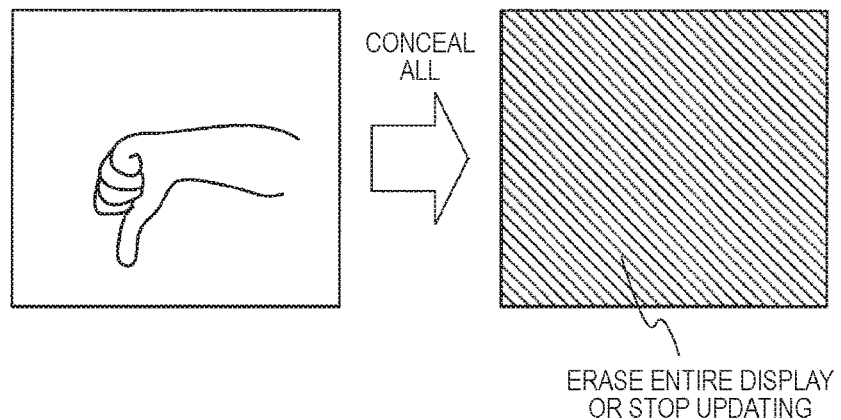
FIG. 10D is an explanatory diagram for explaining an example of an information correction process in an information correction unit provided in an information processing device according to the embodiment.

On the other hand, in the case of determining that it is not possible to conceal only the inappropriate movement or the like, such as in the case of a gesture involving the entire body, or a movement that is too fast to be able to conceal only a portion thereof, for example, the information type discrimination unit 131 determines that the recognition result being focused on is information categorized into (4) above, and determines that it is sufficient to conceal all of the information before transmitting to other people, such as by removing the entire display of the inappropriate movement or the like, or stopping update of the display, as illustrated in FIG. 10D, for example (Process 5).

In this way, the information type discrimination unit 131 objectively determines the movement or the like included in the recognition result, and discriminates the type of the information related to the movement or the like corresponding to the recognition result. After the discrimination result of information related to the movement or the like corresponding to the recognition result is obtained, the information type discrimination unit 131 outputs the obtained discrimination result to the reflected content decision unit 135.

Returning again to FIG. 8, the relationship determination unit 133 included in the reflected content determination unit 121 will be described.

The relationship determination unit 133 is realized by components such as a CPU, ROM, and RAM, for example. The relationship determination unit 133 is a processing unit that determines what kind of relationship exists between the user being focused on and a target different from the user being focused on.

In the reflected content determination unit 121 according to the present embodiment, basically, the reflected content to other people of information related to an inappropriate movement or the like is decided by the reflected content decision unit 135 described later on the basis of preset setting information, and in accordance with the information categories (1) to (4) decided by the information type discrimination unit 131, until a degree is reached whereby an inappropriate movement or the like no longer exists. However, in the case in which a certain specific relationship exists between the user being focused on and a target different from the user being focused on, it is preferable for the reflected content decision unit 135 to make an exception and relax the reflected content to other people of the information related to an inappropriate movement or the like.

Accordingly, the relationship determination unit 133 references user information related to the user and setting information related to the application which are stored in the storage unit 107 or the like, as well as information related to the execution state of the application obtained from the application execution unit 125 described later, and determines the relationship between the user being focused on and a target different from the user being focused on.

Herein, suppose that various types of user information, including the execution state or the like of the application for all users of the application (for example, an application that shares a virtual space such as an online game), are held in the storage unit 107 or the like.

Also, suppose that all setting information related to the application, such as application setting information for the application execution level in the information processing device 10 and the platform 20 (that is, basic application setting information for all users), and application setting information set individually by each user, is held in the storage unit 107 or the like. Suppose that the setting information states static condition settings regarding inappropriate movements or the like as illustrated in FIGS. 5A and 5B, for example, such as the degree to which information is to be reflected to other users in the case in which the user himself or herself performs what kinds of movements, and the degree to which the reflection of such information is to be received in the case in which another user performs an inappropriate movement or the like.

For example, in the case in which the application being executed in the information processing device 10 is a game, such as an online game, the relationship determination unit 133 references the user information for all users in order to reflect the user movement or the like being focused on, and is able to determine relationships between the characters which are the avatars of the users inside the application (that is, inside the virtual space of the game). In other words, in a case of successfully determining that a character A inside the virtual space corresponding to a user A and a character B inside the virtual space corresponding to a user B have been active together inside the virtual space for a certain amount of time or more, and are characters in a close relationship, the relationship between the user A corresponding to the character A and the user B corresponding to the character B can be determined to be close. In this case, regarding the degree of information reflection between the user A and the user B, the relationship determination unit 133 can determine to relax the degree to which the amount of information is moderated. With this arrangement, the degree of reflection statically decided in advance on the basis of "setting information", such as the degree of reflection of inappropriate movements related to the user's facial expressions, for example, is processed exceptionally on the basis of the dynamic condition of the relationship between characters, until an allowable degree is reached in consideration of the closeness of the relationship.

In addition, the relationship determination unit 133 is also able to reference user information as described above, and determine a relationship between users according to whether or not the user A has set the user B as a "friend", or determine a relationship between users by focusing on various attributes such as age, gender, and the total execution time of the application, for example. In this case, the relationship determination unit 133 can relax the degree to which the amount of information is moderated for relationships and attributes which are closer as described above, and tighten the moderation of the amount of information for relationships and attributes which are more distant. Likewise in this case, the degree of reflection decided statically in advance on the basis of "setting information" is processed exceptionally on the basis of the dynamic condition of the relationship between users.

Note that the process of determining the relationship between characters or between users as described above is preferably performed independently for all users to which the user movement or the like being focused on is to be reflected.

In addition, the relationship determination unit 133 may also determination a relationship between the user being focused on and the application itself. In the case in which the application being executed in the information processing device 10 is a game, such as an online game, various events occur inside the virtual space of the game. In this case, the relationship determination unit 133 may also make a determination to process the degree of reflection of inappropriate movements or the like exceptionally, so that the mood of an event is not ruined by user movements. With this arrangement, in the case in which a sad event is occurring inside the virtual space of a game, for example, it becomes possible to control the degree of information reflection so that even if a user performs facetious movements so as to ruin the mood of the moment, those movements are not reflected.

As above, the relationship determination unit 133 outputs a determination result for the relationship between the user being focused on and a target different from the user being focused on to the reflected content decision unit 135 described later.

The reflected content decision unit 135 is realized by components such as a CPU, ROM, and RAM, for example. The reflected content decision unit 135 utilizes the determination result by the information type discrimination unit 131 and the determination result by the relationship determination unit 133 to decide in detail the degree to which the movement or state of the user being focused on is to be reflected to a target different from the user being focused on.

More specifically, in the case of successfully determining overall that an inappropriate movement or the like is not being performed, and the movement or state of the user being focused on may be reflected to the target without being moderated, the reflected content decision unit 135 outputs this result to the application execution unit 125.

Also, in the case of determining that an inappropriate movement or the like is being conducted, the reflected content decision unit 135 decides the degree of information reflection while accounting for the type of information related to the inappropriate movement or the like, and various relationships as described above.

At this point, the reflected content decision unit 135 basically decides the reflected content to other people of information related to the inappropriate movement or the like on the basis of preset setting information, until a degree is reached whereby an inappropriate movement or the like no longer exists. In other words, the reflected content decision unit 135 decides the reflected content (that is, the degree of information correction) on the basis of the relationship between the parties exchanging the information, in accordance with the setting information of the user on the information-transmitting side, and the setting information of the user on the information-receiving side. Additionally, the reflected content decision unit 135 may also decide secondarily reflected content on the basis of not only the parties exchanging the information, but also the setting information of a user who simply shares in the information in a broad sense, such as a third person or the like other than the parties involved in the game or the like, for example.

In addition, the reflected content decision unit 135 may also decide the reflected content (the degree of information correction) as an exception in accordance with a dynamic relationship between the user and the target, or decide the reflected content (the degree of information correction) on the basis of both the relationship between the parties exchanging the information, namely, the setting information of the user on the information-transmitting side and the setting information of the user on the information-receiving side, as well as a dynamic relationship between the user and the target.

The reflected content decision unit 135, after deciding the reflected content of information in this way, outputs the decided content to the information correction unit 123.

The above thus describes a detailed configuration of the reflected content determination unit 121 with reference to FIGS. 8 to 10.

Note that in the above description, a case is described in which the reflected content determination unit 121 determines the reflected content on the basis of only the content of a recognition result by the recognition unit 101. However, the reflected content determination unit 121 may also determine the reflected content on the basis of the type of place (area) where a sensor detection result used in the recognition process by the recognition unit 101 is obtained. In other words, in the case in which the sensor detection result used in the recognition process by the recognition unit 101 is not a result obtained in a certain place, the reflected content determination unit 121 may perform a process so that the recognition result corresponding to the relevant sensor detection result is not reflected. For example, as illustrated schematically in FIG. 11, consider a case in which a virtual boundary is preset on the basis of the positional relationship with the platform 20. In this case, the reflected content determination unit 121 is also able to conduct a process such as utilizing only a recognition result obtained from a sensor detection result detected at a certain position in the space where the platform 20 is installed for the determination of the reflected content.

Next, returning again to FIG. 7, the information correction unit 123 provided in the control unit 103 according to the present embodiment will be described.

The information correction unit 123 is realized by components such as a CPU, ROM, and RAM, for example. The information correction unit 123 corrects information related to an inappropriate movement or the like performed by the user being focused on, on the basis of a determination result output from the reflected content determination unit 121.

As described earlier, the correction process performed by the information correction unit 123 can be classified roughly into the four varieties of (a) moderating the degree of the content of the information related to the user movement or state, (b) replacing the content of the information related to the user movement or state with other content, (c) concealing a portion of the content of the information related to the user movement or state, and (d) concealing all of the content of the information related to the user movement or state.

In the case of moderating the degree of the content of the information, the information correction unit 123 adopts a correction method such as, for example, moderating the degree of a facial expression, reducing the amount of perspiration, preventing the character corresponding to the user from following another for a long time, or applying a filter to a certain band of a waveform signal corresponding to sound or vibration.

In the case of conducting information replacement, the information correction unit 123 adopts a correction method such as, for example, replacing an unpleasant movement with another movement, converting the movement to a template and replacing the information with normalized information, replacing sound or vibrations with other sounds or vibrations or superimposing noise, or substituting in an image indicating a facial expression or the like.

In the case of concealing part of the information, the information correction unit 123 adopts a correction method such as, for example, applying a mosaic to a specific movement or facial expression, removing only a specific sound or vibration, or removing specific features from pulse information.

In the case of concealing all of the information, the information correction unit 123 adopts a correction method such as, for example, deleting or stopping the updating of the player if a specific movement is sensed, deleting all sounds for a certain period if a specific sound is sensed, or deleting all vibrations if a specific vibration is sensed.

Note that the correction process performed by the information correction unit 123 is not limited to the four varieties of (a) to (d) above, and it is possible to appropriately combine any of the above four varieties of correction processes to correct information related to an inappropriate movement or the like.

Note that people from different countries or cultures may respond differently to the same information. For example, the movement of raising the thumb from a closed first (a hand gesture used with the meaning of "good job" or the like) is a movement of praising another person in countries such as the United States of America, but is a movement of insulting another person in Iran. Consequently, it is preferable for the information correction unit 123 to conduct a correction process as above while also taking into account the cultures of the users with which information is shared.

Note that in order for such differences of culture and the like to be reflected in the correction process, a database or the like may be created in advance in the storage unit 107 or the like, the database indicating whether or not different meanings depending on differences between countries or cultures exist with regard to the information related to inappropriate movements or the like, the information to use for replacement, and the like. The correction process may then be performed by additionally referencing such a database or the like.

When conducting the correction of information, a case in which the recognized information and the information to be corrected are different is also conceivable, such as "after recognizing a specific movement, correct information related to another movement or the like related to the specific movement". For example, in the case of recognizing a movement of "making a phone call", it is conceivable not to correct the information related to the movement of "making a phone call", but to correct (conceal) the spoken content of the phone call (that is, voice information). With this arrangement, since the movement of a certain user making a phone call is transmitted to other users, it becomes possible to share among users a state in which the other party is busy, and convenience for the user can be improved. Accordingly, for specific movements like the above, for example, the information correction unit 123 may also record a correction process for the case in which the recognized information and the information to be corrected are different as an exception in a database or the like, and execute a more fine-grained information correction process.

In addition, for cases in which it is possible to determine from the start a high possibility of personal information being included, like with biological information such as pulse, for example, the information correction unit 123 may be configured to conceal the information regardless of the determination result.

The information correction unit 123, after performing a correction process as above, outputs the corrected information to the application execution unit 125.

The application execution unit 125 is realized by components such as a CPU, ROM, and RAM, for example. The application execution unit 125 is a processing unit that executes the application being realized as a function of the information processing device 10 according to the present embodiment. Also, in the case in which user input from a certain user is performed by bodily movements or the like, the application execution unit 125 utilizes information output from the reflected content determination unit 121 and the information correction unit 123 to cause information corresponding to the user input to be reflected in the application. After that, the application execution unit 125 causes information related to the execution state of the application with the information reflected to be transmitted to each platform 20 as notification information via the communication control unit 105 described later. With this arrangement, the users of the platforms 20 connected to the information processing device 10 become able to continuously grasp notification information obtained from the application being executed in the information processing device 10.

Note that in the case in which a correction of the information reflected in the application is performed by the information correction unit 123 according to the present embodiment because of bodily movements or the like performed by a certain user, the application execution unit 125 may also be configured to notify users that a correction has been conducted. The specific method of such a notification is not particularly limited. For example, the application execution unit 125 may cause an object such as an icon indicating that a correction has been conducted to be displayed on a display screen of the platform 20.

An example of such an example is illustrated in FIGS. 12A and 12B, taking as an example a case in which an online game is being executed as the application. In the example illustrated in FIG. 12A, in a user information display region provided on a display screen of the platform 20, a reflection degree presentation object, which is an object indicating the degree of information reflection, is displayed as an object indicating that a correction has been conducted. This reflection degree presentation object is an object using arrows, and indicates the degree to which information is being moderated between the user looking at the display screen and other users. For example, the right-pointing arrow indicates the degree of reflection for information being transmitted from another user to oneself, while the left-pointing arrow indicates the degree of reflection for information being transmitted from oneself to another user. This object is set so that the size of the relevant arrow becomes shorter the more the information being transmitted and received is moderated. By displaying such an object, the user becomes able to easily determine whether or not information is being moderated by the information processing device 10.

Also, a reflection degree presentation object as illustrated in FIG. 12A obviously may be displayed not only in the user information display region of the display screen, but also at a position such as above the head of a character graphic, as illustrated in FIG. 12B, for example.

The above thus describes in detail the configuration of the control unit 103 according to the present embodiment.

Note that in the description above, a detailed description is given by taking the case of the information processing device 10 executing a game application, such as an online game, as a specific example, but the information correction process as described above is similarly applicable to an application that provides a video sharing function of sharing a video of a space being viewed by a first user with a second user.

In a video sharing application as above, information about a space being viewed by a user wearing a sensor such as a head-mounted camera (hereinafter designated the user A for the sake of convenience) is shared with another user (hereinafter designated the user B for the sake of convenience).

In this case, the possibility that inappropriate information is included in the video corresponding to the space being viewed by the user A, and the possibility that the head or gaze of the user A includes inappropriate movements, are conceivable. In the case in which inappropriate information is included in the video, similarly to the case of a game application, by applying a mosaic process to the inappropriate information or removing the relevant information, the inappropriate information can be removed. Also, in the case in which the user performs a physiological phenomenon such as sneezing, or in the case of performing a careless movement of one's gaze, inappropriate movement will be included in the transmitted information. Likewise in these cases, similarly to the case of a game application, by replacing or moderating the degree of the information, it is possible to conceal inappropriate movements.

Furthermore, in a video sharing application as above, it is conceivable for the user B to use a gesture input device and thereby transmit movements to the user A indirectly. Likewise in such cases, there is a possibility that unintended movements by the user B will be transmitted to the user A. Likewise in such cases, it is possible to conduct an information correction process similar to the case of a game application. For example, in a case in which a camera, motion sensor, or the like is utilized to monitor the movements of the user B, and an inappropriate movement occurs, by intentionally moderating the information transmitted from the gesture input device, the transmission of inappropriate information to the user A can be prevented.

Returning again to FIG. 4, in the following, the communication control unit 105 provided in the information processing device 10 according to the present embodiment will be described.

The communication control unit 105 is realized by components such as a CPU, ROM, RAM, and a communication device, for example. The communication control unit 105 is a processing unit that controls communication between the information processing device 10 and the platform 20 over the network 3. Via the communication control unit 105, the recognition unit 101 and the control unit 103 become able to acquire from each platform 20 various types of data and information, such as data from sensor output and application setting data set by the user, and also become able to transmit to each platform 20 various types of information indicating the execution state of the application, including notification information as described above.

The storage unit 107 is realized by components such as RAM and a storage device provided in the information processing device 10 according to the present embodiment, for example. In the storage unit 107, information such as various parameters and the partial results of processes that need to be saved when the information processing device 10 according to the present embodiment conducts some kind of process, or other information such as various databases and programs, are recorded as appropriate. Particularly, in the storage unit 107, information such as entity data related to an application executed by the information processing device 10, setting data set for such an application by all users, and user information related to all users utilizing such an application are recorded. Components such as the recognition unit 101, the control unit 103, and the communication control unit 105 are able to conduct data read/write processes freely on the storage unit 107 in which such various information is stored.

The above thus illustrates an example of the functions of the information processing device 10 according to the present embodiment. Each of the above component elements may be realized using general-purpose members or circuits, but may also be realized in hardware specialized in the function of each component element. Additionally, the functions of each of the component elements may also be conducted entirely by a CPU or the like. Consequently, it is possible to appropriately modify the configuration to be used according to the technological level at the time of carrying out the present embodiment.

Note that it is also possible to develop a computer program for realizing the respective functions of an information processing device according to the present embodiment as described above, and implement the computer program in a personal computer or the like. In addition, a computer-readable recording medium storing such a computer program may also be provided. The recording medium may be a magnetic disk, an optical disc, a magneto-optical disc, or flash memory, for example. Furthermore, the above computer program may also be delivered via a network, for example, without using a recording medium.

<Information Processing Method>

Figure 13:
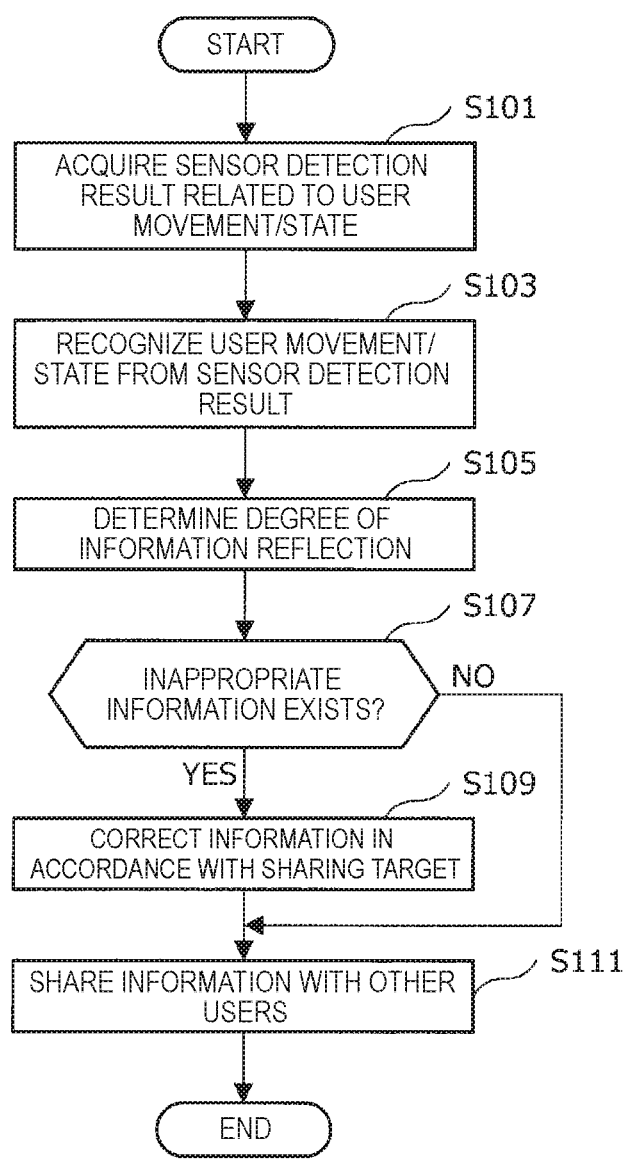
FIG. 13 is a flowchart illustrating an example of a flow of an information processing method according to the embodiment.

Next, an example of the flow of an information processing method according to the present embodiment will be described briefly with reference to FIG. 13. FIG. 13 is a flowchart illustrating an example of the flow of an information processing method according to the present embodiment.

In the information processing device 10 according to the present embodiment, the communication control unit 105 acquires information related to a sensor detection result related to a user movement/state, which is transmitted from each platform 20 (step S101). After that, the communication control unit 105 outputs the acquired information related to a sensor detection result related to a user movement/state to the recognition unit 101 and the control unit 103.

The recognition unit 101 of the information processing device 10 utilizes a recognition technique as described earlier to recognize a user movement or state from the acquired sensor detection result (step S103). After a recognition result related to a user movement or state is obtained from the sensor detection result, the recognition unit 101 outputs the obtained recognition result to the control unit 103.

The control unit 103 of the information processing device 10 references the recognition result from the recognition unit 101, and by conducting a process as described earlier, determines the degree of reflection of the information related to a user movement or state onto notification information (step S105). After that, on the basis of the obtained determination result, the control unit 103 checks whether or not information related to an inappropriate movement or the like (inappropriate information) exists among the obtained information related to a user movement or state (step S107).

In the case in which inappropriate information is not included among the information related to a user movement or state, the control unit 103 executes the operations in step S111 below. On the other hand, in the case in which inappropriate information is included among the information related to a user movement or state, the control unit 103 conducts a process as described earlier, and corrects the information in accordance with the sharing target of the information being focused on (step S109). After that, the control unit 103 utilizes the obtained corrected information to execute the operations in step S111.

In the case in which inappropriate information is not included among the information related to a user movement or state, or after inappropriate information included in the information related to a user movement or state is corrected, the control unit 103 outputs and shares the information related to a movement or state of the user being focused on with other users (step S111).

By conducting such a process, in the information processing method according to the present embodiment, in the case of sharing with others information generated by performing bodily movements or the like, it becomes possible to moderate the transmission to others of information generated by inappropriate bodily movements or the like.

<Modifications>

Figure 14A:
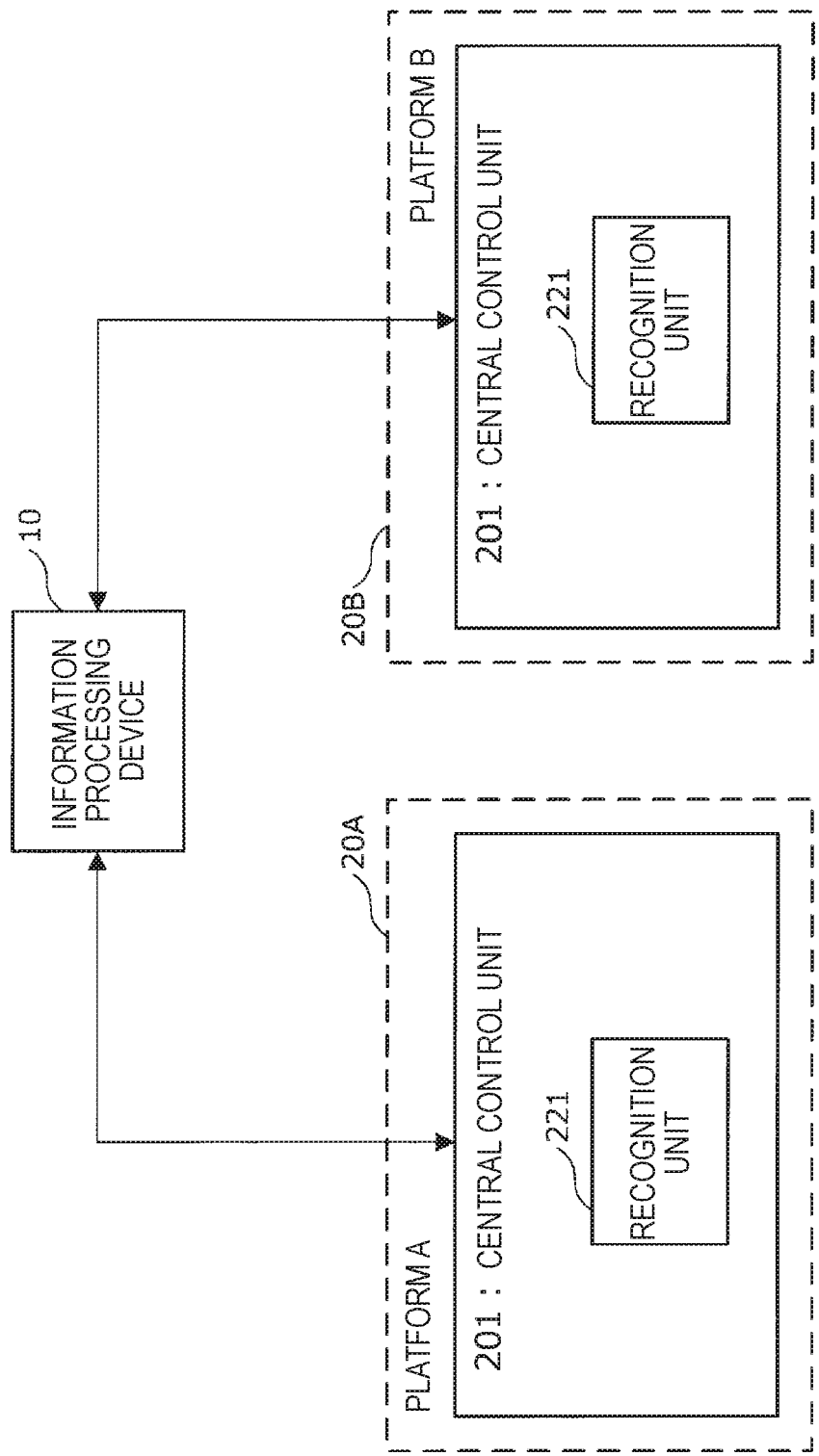
FIG. 14A is an explanatory diagram that schematically illustrates a modification of a platform according to the embodiment.

Next, several modifications of the information processing device and information processing method according to the present embodiment will be described briefly with reference to FIGS. 14A to 15D. FIGS. 14A to 14C are explanatory diagrams that schematically illustrate modifications of a platform according to the present embodiment. FIGS. 15A to 15D are explanatory diagrams illustrating examples of the flow of an information processing method according to these modifications.

The foregoing description describes a detail a case in which, in the information processing system 1 as illustrated in FIG. 1, the recognition process and the information correction process as above are conducted primarily by the information processing device 10. However, at least one of either the recognition unit 101 or the control unit 103 of the information processing device 10 illustrated in FIG. 4 may also be realized by being distributed across multiple computers, and by having these multiple computers cooperate with each other, the recognition process and the information correction process as described above may be realized. In particularly, at least one of either the recognition unit 101 or the control unit 103 of the information processing device 10 illustrated in FIG. 4 may be realized by being distributed between the information processing device 10 and each platform 20, and at least part of the recognition process and the information correction process performed by the information processing device 10 may also be performed by the platform 20.

For example, the example illustrated in FIG. 14A schematically illustrates a case in which, from among the processing units included in the information processing device 10 illustrated in FIG. 4, the functions of the recognition unit 101 are realized by being distributed across each platform 20. In this case, a recognition unit 221 having similar functions and a similar configuration as the recognition unit 101 of the information processing device 10 according to the present embodiment is realized as one function of the central control unit 201 of the platform 20. At this time, the communication control unit 105 included in the information processing device 10 functions as an acquisition unit that acquires information indicating a recognition result by the recognition unit 221 of the platform 20, for example.

Also, the example illustrated in FIG. 14B schematically illustrates a case in which, from among the processing units included in the information processing device 10 illustrated in FIG. 4, the functions of the control unit 103 (in particular, the functions of the reflected content determination unit 121 and the information correction unit 123) are realized by being distributed across each platform 20. In this case, an information reflection control unit 223 having similar functions and a similar configuration as the control unit 103 of the information processing device 10 according to the present embodiment is realized as one function of the central control unit 201 of the platform 20. At this time, the communication control unit 205 included in the platform 20 functions as an acquisition unit that acquires information indicating a recognition result by the recognition unit 101 of the information processing device 10, for example.

Furthermore, the example illustrated in FIG. 14C schematically illustrates a case in which, from among the processing units included in the information processing device 10 illustrated in FIG. 4, the functions of the recognition unit 101 and the control unit 103 are realized by being distributed across each platform 20. In this case, a recognition unit 221 having similar functions and a similar configuration as the recognition unit 101 of the information processing device 10 according to the present embodiment, and an information reflection control unit 223 having similar functions and a similar configuration as the control unit 103 of the information processing device 10 according to the present embodiment, are realized as functions of the central control unit 201 of the platform 20.

As illustrated in FIGS. 14A to 14C, by distributing processes across the information processing device 10 and each platform 20, it becomes possible to reduce the load on the information processing device 10 that acts as a server.

Figure 15A:
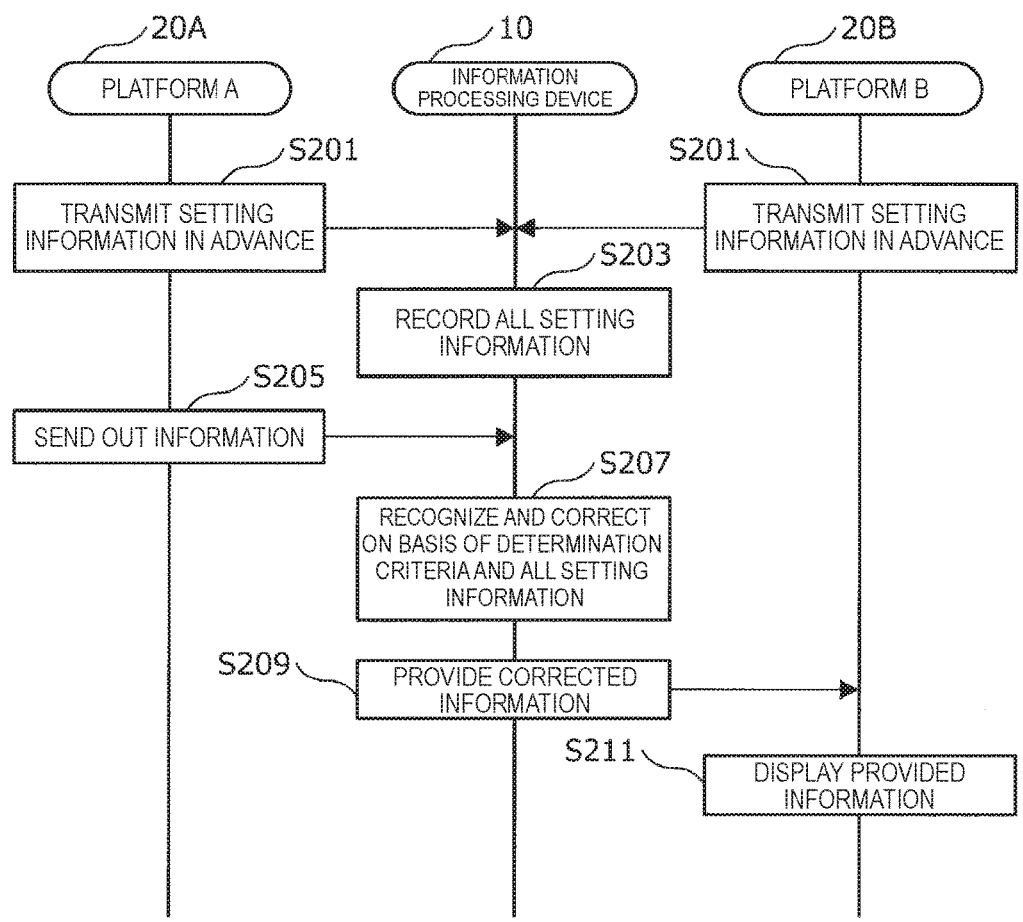
FIG. 15A is a flowchart illustrating an example of a flow of an information processing method according to the embodiment.

Described with focus on the state of cooperation between the information processing device 10 and each platform 20, the process flow in the case of conducting a process centered on the information processing device 10 as described in the foregoing embodiment becomes like FIG. 15A. Note that in the following FIGS. 15A to 15D, the number of platforms 20 that cooperate with the information processing device 10 is taken to be two for the sake of convenience.

As illustrated in FIG. 15A, in the case of conducting a process centered on the information processing device 10 that functions as a server, each of the platforms 20 (platform A and platform B) transmits setting information set by each user (user-level setting information) to the information processing device 10 in advance (step S201). Also, in the information processing device 10, setting information related to all users acquired from each of the platforms 20 is recorded in the storage unit 107 or the like (step S203).

At this point, for the sake of convenience, suppose that the user A possessing the platform A sends out certain information by utilizing bodily movements or the like (step S205). Subsequently, this information is transmitted to the information processing device 10, and the information processing device 10 performs a recognition process and, if necessary, a correction process on the information, on the basis of application-level determination criteria stored in the storage unit 107 or the like, and all setting information from among the users involved (step S207). After that, the information processing device 10 provides corrected information to the platform B possessed by the user B as notification information (step S209).

In the platform B possessed by the user B, the notification information provided by the information processing device 10 is utilized to display such information on a display screen (step S211). With this arrangement, information is shared between the user A and the user B.

In a case as illustrated in FIG. 15A, it is possible for an information processing device 10 designed with high-performance specifications to carry out almost all processes, but as the number of connected platforms 20 increases, the load becomes concentrated on the information processing device 10 functioning as a server.

Figure 15B:
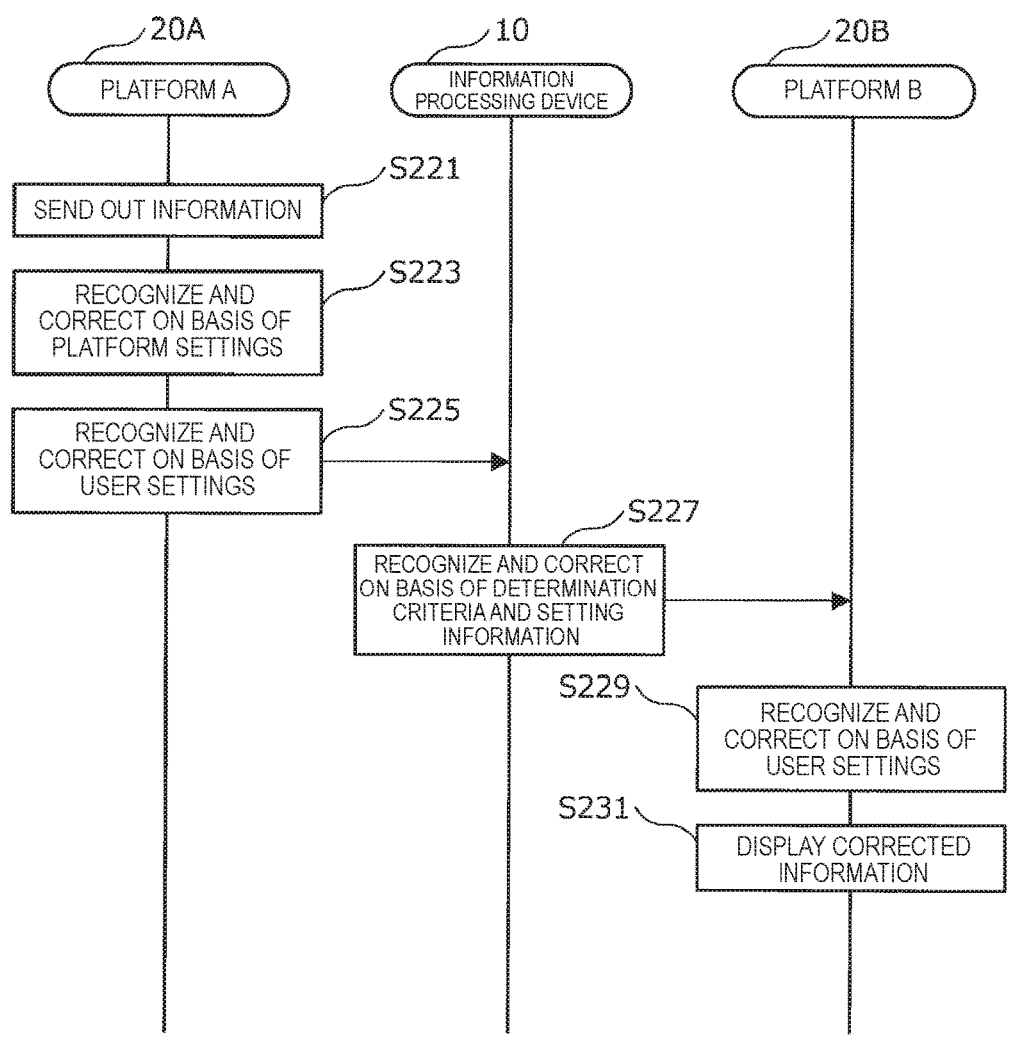
FIG. 15B is an explanatory diagram illustrating an example of a flow of an information processing method according to the modification.

On the other hand, FIG. 15B illustrates a case in which the process is distributed across the information processing device 10 and each of the platforms 20. In this case, suppose that the user A possessing the platform A sends out certain information by utilizing bodily movements or the like (step S221). The platform A recognizes and corrects the sent-out information, on the basis of settings for the platform A (in other words, platform-level setting information) recorded in the platform A (step S223). After that, the platform A performs recognition and correction on a level specialized for the user A, on the basis of user settings (step S225). After that, the platform A transmits the information that has been subjected to two stages of recognition and correction to the information processing device 10.

The information processing device 10 obtains the information from the platform A, recognizes and corrects the acquired information again on the basis of application-level determination criteria and setting information stored in the storage unit 107 or the like (step S227), and provides the information to the platform B as notification information.

In the platform B receiving the provision of notification information, recognition and correction is performed on a level specialized for the user B, on the basis of user settings (step S229). After that, the platform B utilizes the corrected information to display such information on a display screen (step S231). With this arrangement, information is shared between the user A and the user B.

In this way, the example illustrated in FIG. 15B illustrates a case of recognizing and correcting information centered primarily on the platform A which is the sender of the information. However, in such a case, since recognition and correction processes are conducted multiple times in each of the platforms and the information processing device 10, there is a possibility that a delay in the sharing of information may occur, depending on the state of resources.

Figure 15C:
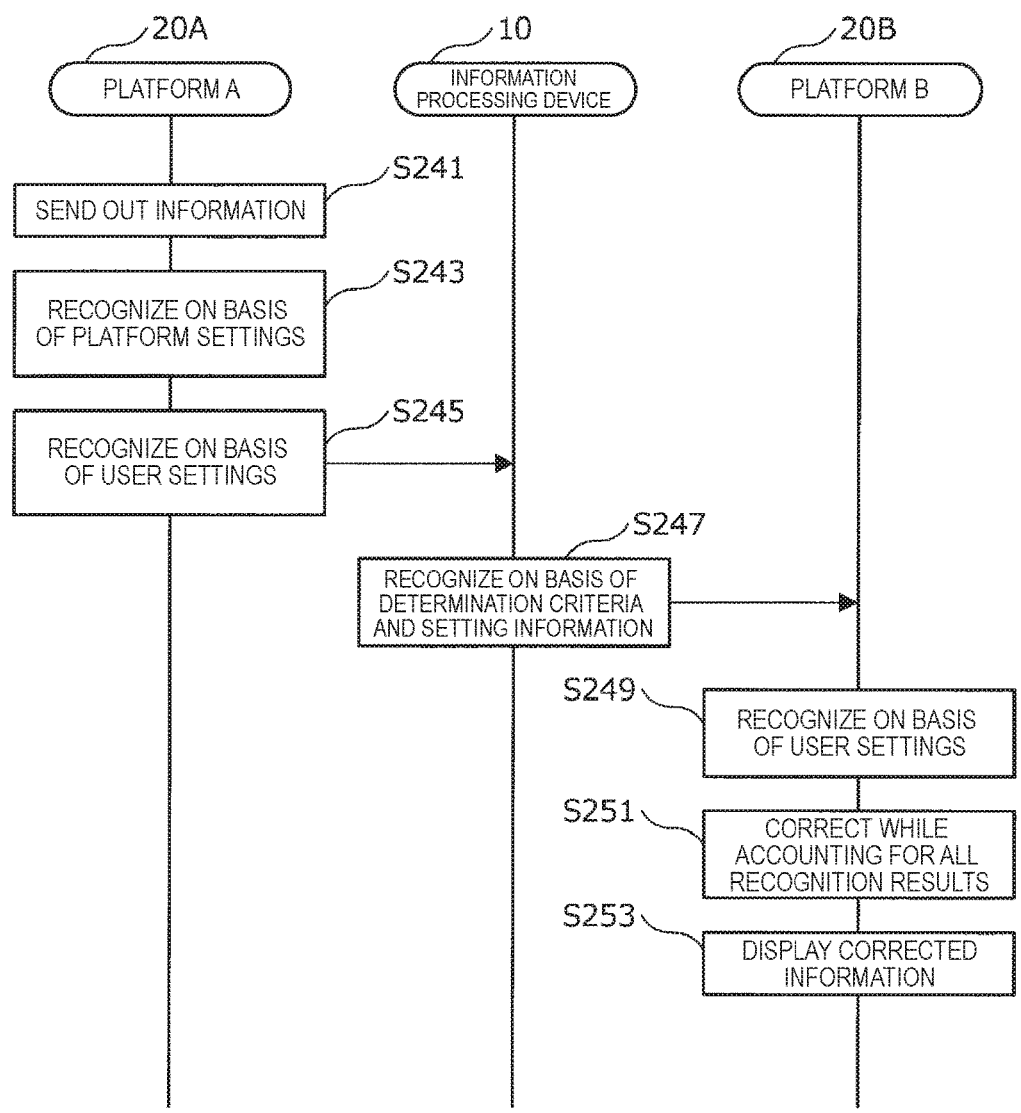
FIG. 15C is an explanatory diagram illustrating an example of a flow of an information processing method according to the modification.

On the other hand, in the example illustrated in FIG. 15C, suppose that the user A possessing the platform A sends out certain information by utilizing bodily movements or the like (step S241). The platform A recognizes the sent-out information, on the basis of settings for the platform A (in other words, platform-level setting information) recorded in the platform A (step S243). After that, the platform A performs recognition on a level specialized for the user A, on the basis of user settings (step S245). After that, the platform A transmits the information that has been subjected to two stages of recognition to the information processing device 10.

The information processing device 10 obtains the information from the platform A, recognizes the acquired information again on the basis of application-level determination criteria and setting information stored in the storage unit 107 or the like (step S247), and provides the information to the platform B.

In the platform B receiving the provision of information, recognition is performed on a level specialized for the user B, on the basis of user settings (step S249). After that, the platform B corrects information while taking into account all recognition results from the platform A, the information processing device 10, and the platform B (step S251). After that, the platform B utilizes the corrected information to display such information on a display screen (step S253). With this arrangement, information is shared between the user A and the user B.

In this way, the example illustrated in FIG. 15C illustrates a case of correcting information centered primarily on the platform B which is the receiver of the information. In such a case, since the correction process is conducted all together on the platform acting as the recipient of the information, redundant portions can be reduced for the system as a whole. However, with such a configuration, the load becomes concentrated on the platform acting as the recipient of information.

Figure 15D:
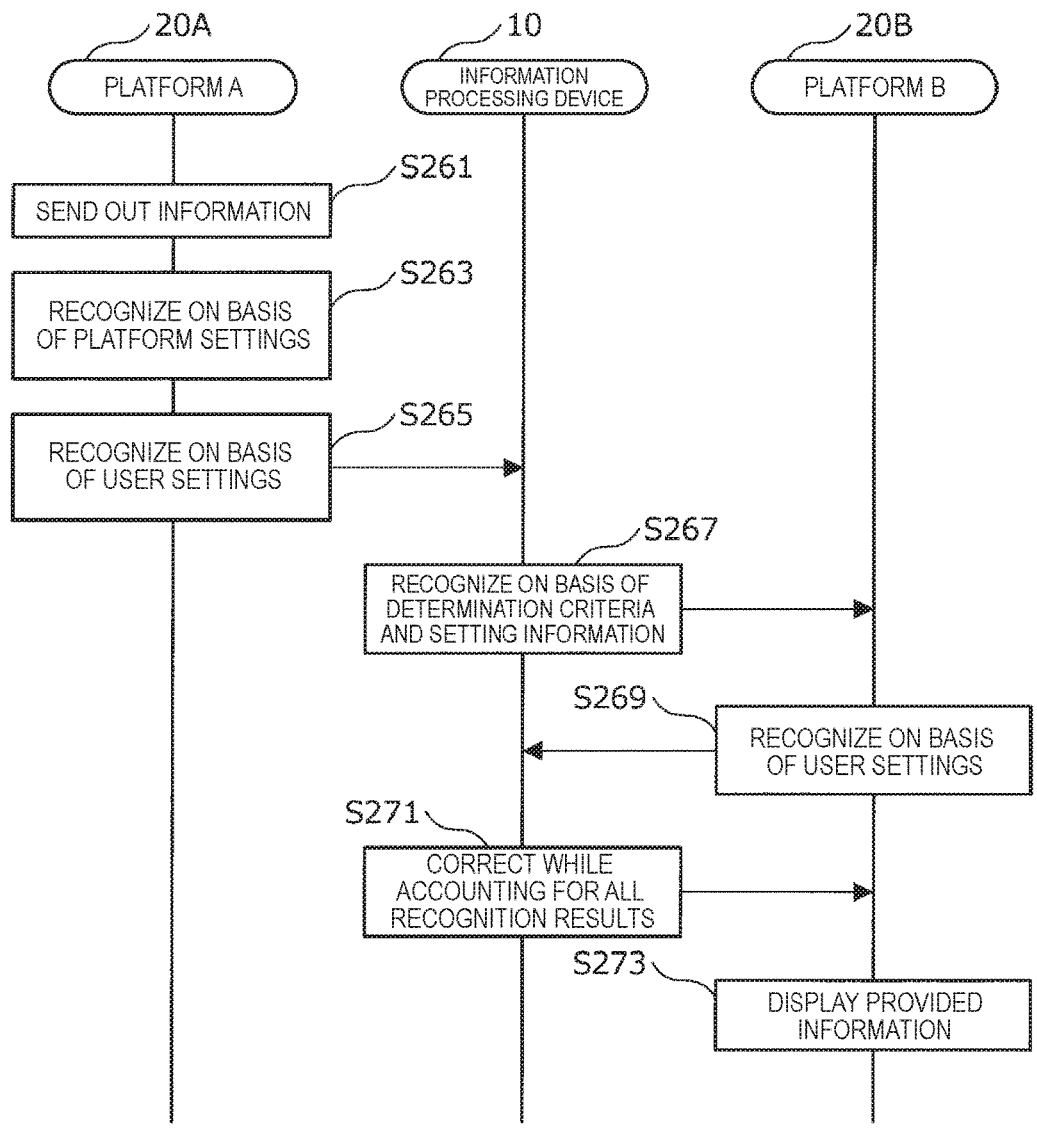
FIG. 15D is an explanatory diagram illustrating an example of a flow of an information processing method according to the modification.

On the other hand, the example illustrated in FIG. 15D illustrates a case in which the information recognition process is distributed across each of the platforms 20, while the correction process is performed by the information processing device 10. In this case, suppose that the user A possessing the platform A sends out certain information by utilizing bodily movements or the like (step S261). The platform A recognizes the sent-out information, on the basis of settings for the platform A (in other words, platform-level setting information) recorded in the platform A (step S263). After that, the platform A performs recognition on a level specialized for the user A, on the basis of user settings (step S265). After that, the platform A transmits the information that has been subjected to two stages of recognition to the information processing device 10.

The information processing device 10 obtains the information from the platform A, recognizes the acquired information again on the basis of application-level determination criteria and setting information stored in the storage unit 107 or the like (step S267), and provides the information to the platform B.

In the platform B receiving the provision of information, recognition is performed on a level specialized for the user B on the basis of user settings (step S269), and the obtained recognition result is transmitted to the information processing device 10.

The information processing device 10 acquires the recognition result by the platform B, corrects information while taking into account all recognition results from the platform A, the information processing device 10, and the platform B (step S271), and provides the corrected information to the platform B as notification information.

After that, the platform B utilizes the notification information provided by the information processing device 10 to display such information on a display screen (step S273). With this arrangement, information is shared between the user A and the user B.

With a configuration as illustrated in FIG. 15D, an individual user's determination criteria (that is, setting information) does not have to be provided to an external device, thereby increasing safety with respect to the leakage of personal information, and also enabling the information correction process to be performed on the information processing device 10 designed with higher-performance specifications. However, since the platform acting as the recipient of information requests the information processing device 10 acting as a server to perform the correction process, there is a possibility that a delay in the sharing of information may occur.

The above thus briefly describes modifications of an information processing device and an information processing method according to the present embodiment with reference to FIGS. 14A to 15D.

(Hardware Configuration)

Figure 16:
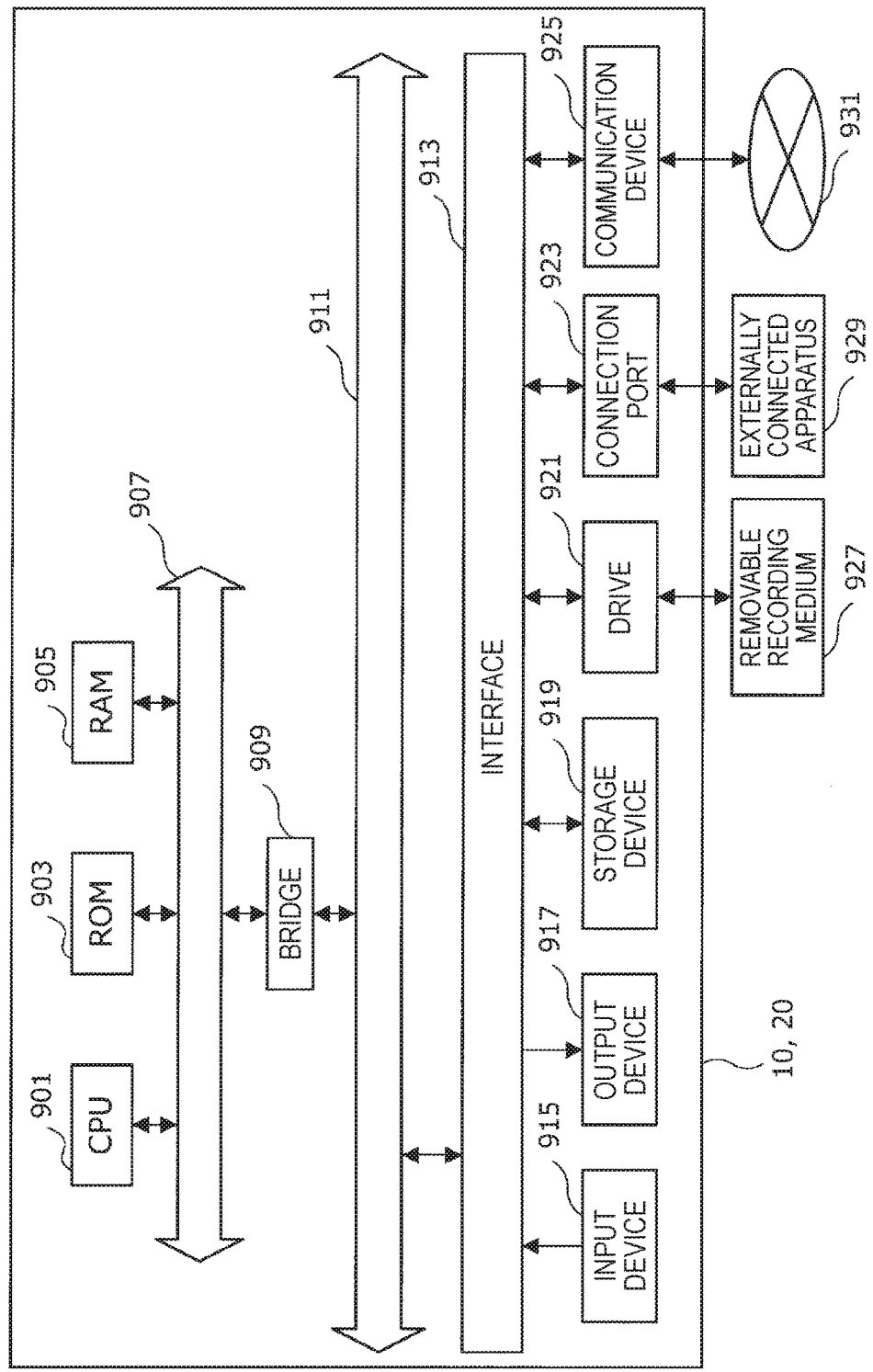
FIG. 16 is a block diagram illustrating an example of a hardware configuration of an information processing device according to an embodiment of the present disclosure.

Next, the hardware configuration of the information processing device 10 according to the embodiment of the present disclosure will be described in detail with reference to FIG. 16. FIG. 16 is a block diagram for illustrating the hardware configuration of the information processing device 10 according to the embodiment of the present disclosure.

The information processing device 10 mainly include a CPU 901, a ROM 903, and a RAM 905. Furthermore, the information processing device 10 also includes a host bus 907, a bridge 909, an external bus 911, an interface 913, a sensor 914, an input device 915, an output device 917, a storage device 919, a drive 921, a connection port 923, and a communication device 925.

The CPU 901 serves as an arithmetic processing device and a control device, and controls the overall operation or a part of the operation of the information processing device 10 according to various programs recorded in the ROM 903, the RAM 905, the storage device 919, or a removable recording medium 927. The ROM 903 stores programs, operation parameters, and the like used by the CPU 901. The RAM 905 primarily stores programs used in execution of the CPU 901 and parameters and the like varying as appropriate during the execution. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected apparatus 929 such as a mobile phone or a PDA conforming to the operation of the information processing device 10. Furthermore, the input device 915 generates an input signal based on, for example, information which is input by a user with the above operation means, and is configured from an input control circuit for outputting the input signal to the CPU 901. The user can input various data to the information processing device 10 and can instruct the information processing device 10 to perform processing by operating this input device 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processes performed by the information processing device 10. More specifically, the display device displays, in the form of texts or images, a result obtained by various processes performed by the information processing device 10. On the other hand, the audio output device converts an audio signal such as reproduced audio data and sound data into an analog signal, and outputs the analog signal.

The storage device 919 is a device for storing data configured as an example of a storage unit of the information processing device 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, and externally obtained various data or the like.

The drive 921 is a reader/writer for recording medium, and is embedded in the information processing device 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing device 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing device 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing device 10 according to the embodiment of the present disclosure has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

Note that a hardware configuration capable of realizing the functions of the platform 20 according to an embodiment of the present disclosure has a configuration similar to a hardware configuration capable of realizing the functions of the information processing device 10 above, and thus detailed description will be reduced or omitted hereinafter.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device, including:

an acquisition unit that acquires a recognition result indicating at least one of a user movement or state recognized by a recognition unit utilizing a detection result from one or a plurality of sensors; and a control unit that, in a case of determining that the recognition result indicates a specific user movement or state, controls a degree of reflection in which information related to the specific user movement or state is reflected in notification information that transmits the information related to the specific user movement or state to a target different from the user, in accordance with the target.

(2)

The information processing device according to (1), in which the control unit corrects content of the information related to the recognized user movement or state in accordance with the recognition result by the recognition unit, and causes information related to the corrected user movement or state to be reflected in the notification information.

(3)

The information processing device according to (1) or (2), in which the control unit selects, in accordance with the recognition result by the recognition unit, a correction to moderate the content of the information related to the user movement or state, to replace the content of the information related to the user movement or state with other content, or to conceal at least a portion of the content of the information related to the user movement or state.

(4)

The information processing device according to any one of (1) to (3), in which the control unit changes a degree of the correction in accordance with a dynamic relationship between the user and the target.

(5)

The information processing device according to any one of (1) to (3), in which the control unit changes a degree of the correction in accordance with setting information about the degree of reflection for a user on a side of transmitting the information related to the user movement or state, and setting information about the degree of reflection for a user on a side of receiving the information related to the user movement or state.

(6)

The information processing device according to any one of (1) to (3), in which the control unit changes a degree of the correction in accordance with both
- a dynamic relationship between a user on a side of transmitting the information related to the user movement or state and a user on a side of receiving the information related to the user movement or state, and
- setting information about the degree of reflection for the user on the side of transmitting the information related to the user movement or state and setting information about the degree of reflection for the user on the side of receiving the information related to the user movement or state.

(7)

The information processing device according to any one of (1) to (6), in which the control unit causes an object indicating the degree of reflection of the information related to the user movement or state from a first user to a second user to be displayed on a display screen referenced by the first user and the second user.

(8)

The information processing device according to any one of (1) to (7), in which the specific user movement or state is at least one of
- a user's bodily movement,
- a user's facial expression,
- biological information related to a user, or
- an odor, sound, or vibration by a user or existing around a user.

(9)

The information processing device according to any one of (1) to (8), in which the sensor is at least one of a camera, a motion sensor, a barometric pressure sensor, an odor sensor, a vibration sensor, a microphone, an illuminance sensor, or a biological sensor.

(10)

The information processing device according to any one of (1) to (9), in which the target is another user utilizing an application that provides a virtual space shared among a plurality of users.

(11)

The information processing device according to any one of (1) to (9), in which the target is another user utilizing an application that provides a video sharing function of sharing a video of a space being viewed by a first user with a second user.

(12)

The information processing device according to any one of (1) to (11), in which at least one of the recognition unit or the control unit is realized by being distributed across a plurality of computers.

(13)

An information processing method, including:

acquiring a recognition result indicating at least one of a user movement or state recognized by a recognition unit utilizing a detection result from one or a plurality of sensors; and controlling, in a case of determining that the recognition result indicates a specific user movement or state, a degree of reflection in which information related to the specific user movement or state is reflected in notification information that transmits the information related to the specific user movement or state to a target different from the user, in accordance with the target.

(14)

A program for a computer able to acquire a recognition result by a recognition unit that recognizes at least one of a user movement or state utilizing a detection result from one or a plurality of sensors, the program causing the computer to realize:

an acquisition function that acquires a recognition result recognized by the recognition unit and indicating at least one of a user movement or state; and a control function that, in a case of determining that the recognition result indicates a specific user movement or state, controls a degree of reflection in which information related to the specific user movement or state is reflected in notification information that transmits the information related to the specific user movement or state to a target different from the user, in accordance with the target.

REFERENCE SIGNS LIST 1 information processing system
10 information processing device
20 platform
101 recognition unit
103 control unit
105 communication control unit
107 storage unit
121 reflected content determination unit
123 information correction unit
125 application execution unit
131 information type discrimination unit
133 relationship determination unit
135 reflected content decision unit
201 central control unit
203 sensor output acquisition unit
205 communication control unit 207 output control unit
209 storage unit
221 recognition unit
223 information reflection control unit

The invention claimed is:

1. An information processing device, comprising:
a recognition unit configured to recognize at least one of a user movement or a user state based on a detection result from one or more sensors;
an acquisition unit configured to acquire a recognition result indicating the recognized at least one of the user movement or the user state recognized by the recognition unit;
a relationship determination unit configured to determine a dynamic relationship between a first user and a second user based on user information associated with the first user and the second user; and
a control unit configured to:
determine that the recognition result indicates at least one of a specific user movement or a specific user state;
control a degree of reflection in which information related to the at least one of the specific user movement or the specific user state is reflected in notification information,
wherein the degree of reflection is controlled based on the determined dynamic relationship between the first user and the second user; and
control transmission of the notification information from the first user to the second user,
wherein the notification information includes the information related to the at least one of the specific user movement or the specific user state.

2. The information processing device according to claim 1, wherein the control unit is further configured to:
correct content of the information related to the recognized at least one of the user movement or the user state based on the recognition result; and
reflect the corrected content of the information related to the recognized at least one of the user movement or the user state in the notification information.

3. The information processing device according to claim 2, wherein to correct content of the information related to the recognized at least one of the user movement or the user state, the control unit is further configured to select at least one of a correction to moderate the content of the information related to the recognized at least one of the user movement or the user state, to replace the content of the information related to the recognized at least one of the user movement or the user state with other content, or to conceal at least a portion of the content of the information related to the recognized at least one of the user movement or the user state.

4. The information processing device according to claim 2, wherein the control unit is further configured to change a degree of the correction of the content of the information related to the recognized at least one of the user movement or the user state based on first setting information about the degree of reflection for the first user on a side of the transmission of the notification information and second setting information about the degree of reflection for the second user on a side of reception of the notification information.

5. The information processing device according to claim 2, wherein the control unit is further configured to change a degree of the correction of the content of the information related to the recognized at least one of the user movement or the user state based on both:
the dynamic relationship between the first user on a side of the transmission of the notification information and the second user on a side of reception of the notification information; and
first setting information about the degree of reflection for the first user and second setting information about the degree of reflection for the second user.

6. The information processing device according to claim 1, wherein
the control unit is further configured to control a display screen to display an object indicating the degree of reflection of the information related to the at least one of the specific user movement or the specific user state, and
the display screen is referenced by the first user and the second user.

7. The information processing device according to claim 1, wherein the at least one of the specific user movement or the specific user state is at least one of a user's bodily movement, a user's facial expression, a user's biological information, or an odor, sound, or vibration by a user or existing around the user.

8. The information processing device according to claim 1, wherein the one or more sensors include at least one of a camera, a motion sensor, a barometric pressure sensor, an odor sensor, a vibration sensor, a microphone, an illuminance sensor, or a biological sensor.

9. The information processing device according to claim 1, wherein the second user utilizes an application configured to provide a virtual space shared among the first user and the second user.

10. The information processing device according to claim 1, wherein the second user utilizes an application configured to provide a video sharing function to share a video of a space viewed by the first user and the second user.

11. The information processing device according to claim 1, wherein at least one of the recognition unit or the control unit is distributed across a plurality of computers.

12. An information processing method, comprising:
recognizing at least one of a user movement or a user state based on a detection result from one or more sensors;
acquiring a recognition result indicating the recognized at least one of the user movement or the user state;
determining a dynamic relationship between a first user and a second user based on user information associated with the first user and the second user;
determining that the recognition result indicates at least one of a specific user movement or a specific user state;
controlling a degree of reflection in which information related to the at least one of the specific user movement or the specific user state is reflected in notification information,
wherein the degree of reflection is controlled based on the determined dynamic relationship between the first user and the second user; and
controlling transmission of the notification information from the first user to the second user,
wherein the notification information includes the information related to the at least one of the specific user movement or the specific user state.

13. A non-transitory computer-readable medium having stored thereon, computer-executable instructions which, when executed by a computer, cause the computer to execute operations, the operations comprising:

recognizing at least one of a user movement or a user state based on a detection result from one or more sensors;
acquiring a recognition result indicating the recognized at least one of the user movement or the user state;
determining a dynamic relationship between a first user and a second user based on user information associated with the first user and the second user;
determining that the recognition result indicates at least one of a specific user movement or a specific user state;
controlling a degree of reflection in which information related to the at least one of the specific user movement or the specific user state is reflected in notification information,
wherein the degree of reflection is controlled based on the determined dynamic relationship between the first user and the second user; and
controlling transmission of the notification information from the first user to the second user,
wherein the notification information includes the information related to the at least one of the specific user movement or the specific user state.

* * * * *